US012582894B2

(12) United States Patent
Naito et al.

(10) Patent No.: US 12,582,894 B2
(45) Date of Patent: \*Mar. 24, 2026

(54) METHOD OF COMPETITION SCORING, NON-TRANSITORY COMPUTER READABLE RECORDING MEDIUM, AND COMPETITION SCORING APPARATUS

(71) Applicant: FUJITSU LIMITED, Kawasaki (JP)

(72) Inventors: Hirohisa Naito, Fuchu (JP); Junko Ozaki, Ota (JP)

(73) Assignee: Fujitsu Limited, Kawasaki (JP)

( * ) Notice: Subject to any disclaimer, the term of this patent is extended or adjusted under 35 U.S.C. 154(b) by 646 days.

This patent is subject to a terminal disclaimer.

(21) Appl. No.: 17/582,084

(22) Filed: Jan. 24, 2022

(65) Prior Publication Data

US 2022/0143485 A1 May 12, 2022

Related U.S. Application Data

(63) Continuation of application No. PCT/JP2019/029654, filed on Jul. 29, 2019.

(51) Int. Cl.
*A63B 71/06* (2006.01)
*G06F 3/14* (2006.01)
(Continued)

(52) U.S. Cl.
CPC ............ *A63B 71/0669* (2013.01); *G06F 3/14* (2013.01); *A63B 1/00* (2013.01); *A63B 3/00* (2013.01);
(Continued)

(58) Field of Classification Search
CPC ...... G06V 40/23; G06V 40/103; G06V 20/42; G09B 19/0038; A63B 71/06;
(Continued)

(56) References Cited

U.S. PATENT DOCUMENTS 9,358,456 B1 \* 6/2016 Challinor ................ A63F 13/44
11,645,872 B2 \* 5/2023 Naito ..................... G06V 40/23
482/8

(Continued)

FOREIGN PATENT DOCUMENTS

JP      2014-133015      7/2014
JP      2016-081504      5/2016
(Continued)

OTHER PUBLICATIONS

Adam Bolton, "Fujitsu is developing a robot that can judge gymnastics for Tokyo's 2020 Olympics", cnet.com, May 25, 2016, <https://www.cnet.com/tech/tech-industry/fujitsu-is-a-robot-that-can-judge-gymnastics-for-tokyos-2020-olympics/?via=indexdotco> (Year: 2016).*

(Continued)

*Primary Examiner* — Justin L Myhr
(74) *Attorney, Agent, or Firm* — Fujitsu Intellectual Property Center

(57)      ABSTRACT

A display method for outputting a result of scoring for a performance of a scoring competition, the display method includes obtaining input information regarding to the scoring competition, obtaining a recognition result of a plurality of elements included in the performance, determining a difficulty level of each of the plurality of elements based on the recognition result and a first rule, limiting a target to be used for the scoring to a part of the plurality of elements according to the difficulty level of each of the plurality of elements, and outputting a scoring screen that includes a first display area displaying the plurality of elements and the difficulty level, a second display area for an aggregate result, (Continued)

third display area for a score of the performance directed to the limited part of the elements, and a fourth display area for a 3D model of the athlete.

15 Claims, 17 Drawing Sheets

(51) Int. Cl.

| | |
|---|---|
| *A63B 1/00* | (2006.01) |
| *A63B 3/00* | (2006.01) |
| *A63B 5/12* | (2006.01) |
| *A63B 7/02* | (2006.01) |

(52) U.S. Cl.
CPC . *A63B 5/12* (2013.01); *A63B 7/02* (2013.01); *A63B 2244/12* (2013.01); *A63B 2244/22* (2013.01)

(58) Field of Classification Search
CPC ............ A63B 71/0669; A63B 24/0006; A63B 24/0062; A63B 2024/0065; A63B 2071/0636; A63B 2220/803; G06F 3/14
See application file for complete search history.

(56) References Cited

U.S. PATENT DOCUMENTS

| | | | |
|---|---|---|---|
| 2012/0310390 A1 | 12/2012 | Lin et al. | |
| 2013/0223707 A1 | 8/2013 | Stephenson | |
| 2015/0029220 A1* | 1/2015 | Hittel ..................... | H04W 4/029 |
| | | | 345/633 |
| 2015/0057966 A1* | 2/2015 | Winter ................. | A61B 5/1122 |
| | | | 702/141 |
| 2016/0042652 A1 | 2/2016 | Nagai et al. | |
| 2016/0104298 A1 | 4/2016 | Nam | |
| 2016/0277812 A1* | 9/2016 | Bokowski ................ | G09G 5/12 |
| 2017/0274256 A1* | 9/2017 | Brekke .................. | A63B 60/42 |
| 2019/0220658 A1 | 7/2019 | Kawashima et al. | |
| 2019/0388791 A1* | 12/2019 | Lapoint ................. | A63F 13/327 |
| 2020/0188736 A1 | 6/2020 | Naito et al. | |
| 2020/0346095 A1 | 11/2020 | Kubota et al. | |

FOREIGN PATENT DOCUMENTS

| | | |
|---|---|---|
| JP | 2018-153388 A | 10/2018 |
| WO | 2014/162787 A1 | 10/2014 |
| WO | 2018/069985 A1 | 4/2018 |
| WO | 2019/049216 A1 | 3/2019 |
| WO | 2019/146024 A1 | 8/2019 |

OTHER PUBLICATIONS

International Search Report and Written Opinion of the International Searching Authority (Form PCT/ISA/210, 220, and 237), mailed in connection with PCT/JP2019/029654 and mailed Oct. 15, 2019 (Total 9 pages).
CNOA—Chinese Office Action (The Second Office Action) issued Jul. 22, 2021 for corresponding Chinese Patent Application No. 201780094546.X.
CNOA—Chinese Office Action (The First Office Action) issued Nov. 23, 2020 for corresponding Chinese Patent Application No. 201780094546.X.
International Search Report and Written Opinion mailed on Dec. 12, 2017 for International Application No. PCT/JP2017/032000, 9 pages including English translation of the International Search Report.
Nihon Keizai Shimbun, [online], Aug. 9, 2017 [retrieved: Dec. 4, 2017], Internet <URL:http://www.nikkei.com/article/DGXMZO18991720Z10C17A7000000//>, pp. 1-5. [Cited in International Search Report filed herewith].
EPOA—European Office Action dated Apr. 7, 2022 for European Patent Application No. 17924726.7.
EESR—European Search Report mailed on Aug. 27, 2020 for corresponding European Patent Application No. 17924726.7.
Hui Zhang et al., "Grading Tai Chi Performance in Competition with RGBD Sensors", Computer Vision—ECCV 2014 Workshops, 2015 (2015), XP055723233.
Swinguru: "Chloe Leurquin—Swinguru Pro Presentation", Nov. 25, 2014, p. 1, XP054980795, retrieved from internet: URL: https://www.youtube.com/watch?v=M3tbobua-_E.
JPOA—Japanese Office Action mailed on Oct. 26, 2021 for corresponding Japanese Patent Application No. 2019-540162 (9 pages).
JPOA—Japanese Office Action mailed on Mar. 30, 2021 for corresponding Japanese Patent Application No. 2019-540162.
Sports Innovators Online, https://www.nikkei.com/article/DGXMZO18991720Z10C17A7000000/, Jul. 21, 2017.
USPTO—Notice of Allowance mailed on Feb. 15, 2023 for U.S. Appl. No. 16/802,596 [patented].
USPTO—Final Office Action mailed on Sep. 20, 2022 for U.S. Appl. No. 16/802,596 [patented].
USPTO—Non-Final Office Action mailed on May 5, 2022 for U.S. Appl. No. 16/802,596 [patented].

* cited by examiner

FIG. 2

| ELEMENT IDENTIFICATION INFORMATION | START FRAME NUMBER | END FRAME NUMBER | PRESENCE/ ABSENCE OF FALL |
|---|---|---|---|
| ELEMENT 0001 | 720 | 810 | |
| ELEMENT 0005 | 900 | 1140 | |
| ELEMENT 0010 | 1200 | 1290 | PRESENCE |
| ELEMENT 0004 | 1350 | 1440 | |
| ... | ... | ... | ... |

| ELEMENT IDENTIFICATION INFORMATION | DIFFICULTY LEVEL |
|---|---|
| ELEMENT 0001 | C |
| ELEMENT 0002 | A |
| ELEMENT 0003 | C |
| ELEMENT 0004 | F |
| ELEMENT 0005 | B |
| ELEMENT 0006 | D |
| ELEMENT 0007 | B |
| ... | ... |

| ELEMENT IDENTIFICATION INFORMATION | GROUP |
|---|---|
| ELEMENT 0001 | GROUP (2) |
| ELEMENT 0002 | GROUP (2) |
| ELEMENT 0003 | GROUP (3) |
| ELEMENT 0004 | GROUP (1) |
| ELEMENT 0005 | GROUP (2) |
| ELEMENT 0006 | GROUP (3) |
| ELEMENT 0007 | GROUP (1) |
| ... | ... |

| CONDITION | | | SCORING RULE |
|---|---|---|---|
| EVENT | GENDER | CLASS CLASSIFICATION | |
| RINGS | MALE | JUNIOR | INFORMATION OF SCORING RULE CORRESPONDING TO CONDITIONS (RINGS, MALE, JUNIOR) |
| | | SENIOR | INFORMATION OF SCORING RULE CORRESPONDING TO CONDITIONS (RINGS, MALE, SENIOR) |
| POMMEL HORSE | MALE | JUNIOR | INFORMATION OF SCORING RULE CORRESPONDING TO CONDITIONS (POMMEL HORSE, MALE, JUNIOR) |
| | | SENIOR | INFORMATION OF SCORING RULE CORRESPONDING TO CONDITIONS (POMMEL HORSE, MALE, SENIOR) |
| PARALLEL BARS | MALE | JUNIOR | INFORMATION OF SCORING RULE CORRESPONDING TO CONDITIONS (PARALLEL BARS, MALE, JUNIOR) |
| | | SENIOR | INFORMATION OF SCORING RULE CORRESPONDING TO CONDITIONS (PARALLEL BARS, MALE, SENIOR) |
| HORIZONTAL BAR | MALE | JUNIOR | INFORMATION OF SCORING RULE CORRESPONDING TO CONDITIONS (HORIZONTAL BAR, MALE, JUNIOR) |
| | | SENIOR | INFORMATION OF SCORING RULE CORRESPONDING TO CONDITIONS (HORIZONTAL BAR, MALE, SENIOR) |
| VAULT | MALE | JUNIOR | INFORMATION OF SCORING RULE CORRESPONDING TO CONDITIONS (VAULT, MALE, JUNIOR) |
| | | SENIOR | INFORMATION OF SCORING RULE CORRESPONDING TO CONDITIONS (VAULT, MALE, SENIOR) |
| | FEMALE | JUNIOR | INFORMATION OF SCORING RULE CORRESPONDING TO CONDITIONS (VAULT, FEMALE, JUNIOR) |
| | | SENIOR | INFORMATION OF SCORING RULE CORRESPONDING TO CONDITIONS (VAULT, FEMALE, SENIOR) |
| FLOOR | MALE | JUNIOR | INFORMATION OF SCORING RULE CORRESPONDING TO CONDITIONS (FLOOR, MALE, JUNIOR) |
| | | SENIOR | INFORMATION OF SCORING RULE CORRESPONDING TO CONDITIONS (FLOOR, MALE, SENIOR) |
| | FEMALE | JUNIOR | INFORMATION OF SCORING RULE CORRESPONDING TO CONDITIONS (FLOOR, FEMALE, JUNIOR) |
| | | SENIOR | INFORMATION OF SCORING RULE CORRESPONDING TO CONDITIONS (FLOOR, FEMALE, SENIOR) |
| BALANCE BEAM | FEMALE | JUNIOR | INFORMATION OF SCORING RULE CORRESPONDING TO CONDITIONS (BALANCE BEAM, FEMALE, JUNIOR) |
| | | SENIOR | INFORMATION OF SCORING RULE CORRESPONDING TO CONDITIONS (BALANCE BEAM, FEMALE, SENIOR) |
| UNEVEN PARALLEL BARS | FEMALE | JUNIOR | INFORMATION OF SCORING RULE CORRESPONDING TO CONDITIONS (UNEVEN PARALLEL BARS, FEMALE, JUNIOR) |
| | | SENIOR | INFORMATION OF SCORING RULE CORRESPONDING TO CONDITIONS (UNEVEN PARALLEL BARS, FEMALE, SENIOR) |
| ... | ... | ... | ... |

| ELEMENT IDENTIFICATION INFORMATION | START FRAME NUMBER | END FRAME NUMBER | UNSUCCESS FLAG | SCORING TARGET FLAG | PRESENCE/ ABSENCE OF FALL | DIFFICULTY LEVEL | GROUP |
|---|---|---|---|---|---|---|---|
| ELEMENT 0001 | OOOO | OOOO | ON | | | A | |
| ELEMENT 0005 | OOOO | OOOO | | ON | | D | GROUP (1) |
| ELEMENT 0002 | OOOO | OOOO | | ON | | A | GROUP (2) |
| ELEMENT 0010 | OOOO | OOOO | | ON | | B | GROUP (2) |
| ELEMENT 0005 | OOOO | OOOO | ON | | | B | |
| ELEMENT 0003 | OOOO | OOOO | | ON | | C | GROUP (3) |
| ⋮ | ⋮ | ⋮ | ⋮ | ⋮ | ⋮ | ⋮ | ⋮ |
| ELEMENT 0002 | OOOO | OOOO | | | | A | GROUP (2) |
| ⋮ | ⋮ | ⋮ | ⋮ | ⋮ | ⋮ | ⋮ | ⋮ |
| ELEMENT 0011 | OOOO | OOOO | | | PRESENCE | A | |
| ⋮ | ⋮ | ⋮ | ⋮ | ⋮ | ⋮ | ⋮ | ⋮ |

200B

SCORE CALCULATION
RESULT INFORMATION
(D-SCORE, DV, EG)

| ELEMENT IDENTIFICATION INFORMATION | START FRAME NUMBER | END FRAME NUMBER | UNSUCCESS FLAG | SCORING TARGET FLAG | PRESENCE/ ABSENCE OF FALL | DIFFICULTY LEVEL | CLASSIFICATION |
|---|---|---|---|---|---|---|---|
| ELEMENT 0026 | OOOO | OOOO | | ON | | D | ACROBATICS TYPE |
| ELEMENT 0025 | OOOO | OOOO | | | | B | ACROBATICS TYPE |
| ELEMENT 0026 | OOOO | OOOO | | ON | | D | ACROBATICS TYPE |
| ELEMENT 0023 | OOOO | OOOO | | ON | | C | DANCE TYPE |
| ELEMENT 0025 | OOOO | OOOO | | ON | | D | DANCE TYPE |
| ELEMENT 0033 | OOOO | OOOO | ON | | | B | ACROBATICS TYPE |
| ⋮ | ⋮ | ⋮ | ⋮ | ⋮ | ⋮ | ⋮ | ⋮ |
| ELEMENT 0027 | OOOO | OOOO | | | PRESENCE | A | ACROBATICS TYPE |
| ⋮ | ⋮ | ⋮ | ⋮ | ⋮ | ⋮ | ⋮ | ⋮ |

201B

SCORE CALCULATION RESULT INFORMATION (D-SCORE, DV, CR, CV)

FIG. 13

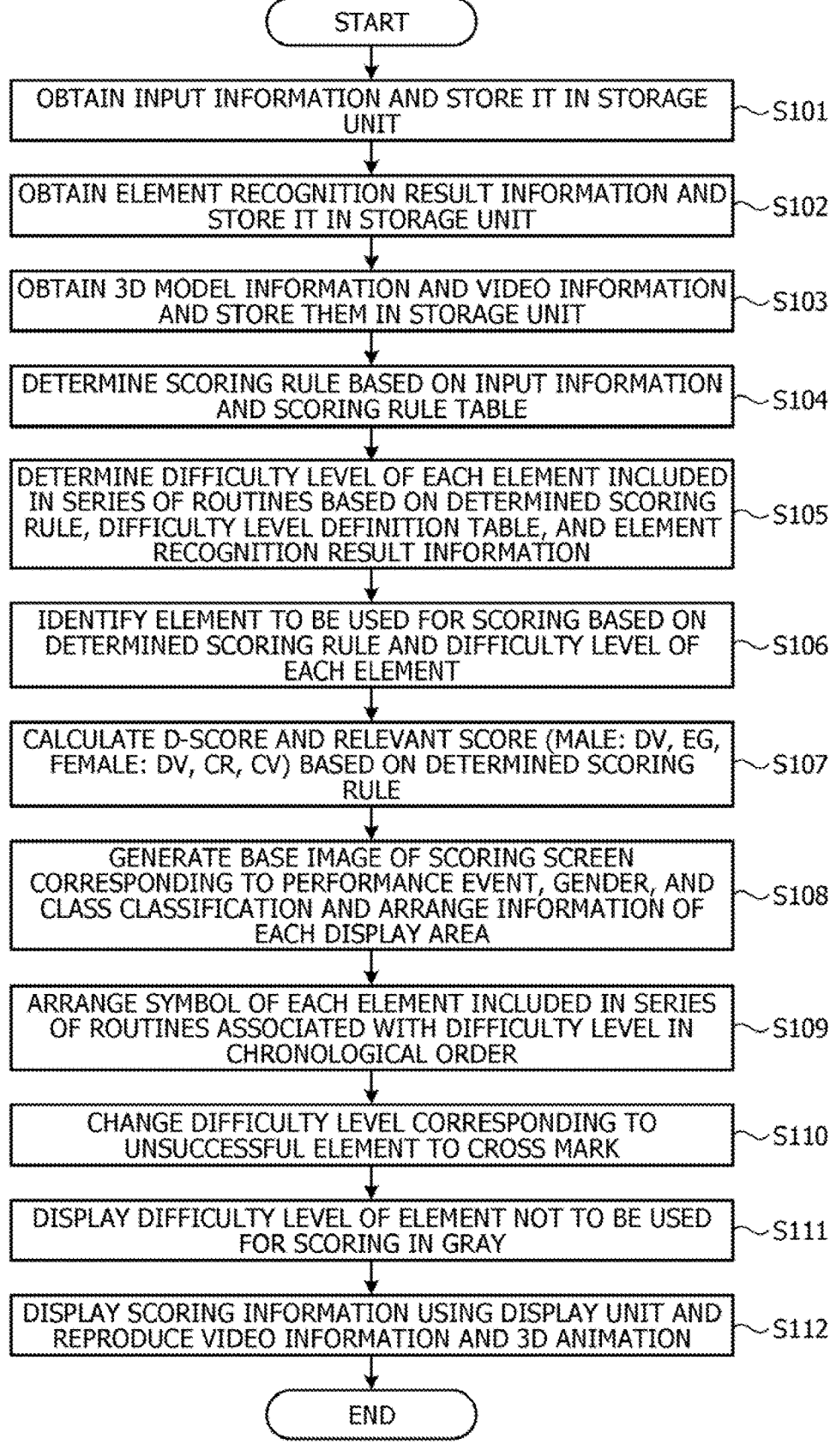

START

OBTAIN INPUT INFORMATION AND STORE IT IN STORAGE UNIT ~S101

OBTAIN ELEMENT RECOGNITION RESULT INFORMATION AND STORE IT IN STORAGE UNIT ~S102

OBTAIN 3D MODEL INFORMATION AND VIDEO INFORMATION AND STORE THEM IN STORAGE UNIT ~S103

DETERMINE SCORING RULE BASED ON INPUT INFORMATION AND SCORING RULE TABLE ~S104

DETERMINE DIFFICULTY LEVEL OF EACH ELEMENT INCLUDED IN SERIES OF ROUTINES BASED ON DETERMINED SCORING RULE, DIFFICULTY LEVEL DEFINITION TABLE, AND ELEMENT RECOGNITION RESULT INFORMATION ~S105

IDENTIFY ELEMENT TO BE USED FOR SCORING BASED ON DETERMINED SCORING RULE AND DIFFICULTY LEVEL OF EACH ELEMENT ~S106

CALCULATE D-SCORE AND RELEVANT SCORE (MALE: DV, EG, FEMALE: DV, CR, CV) BASED ON DETERMINED SCORING RULE ~S107

GENERATE BASE IMAGE OF SCORING SCREEN CORRESPONDING TO PERFORMANCE EVENT, GENDER, AND CLASS CLASSIFICATION AND ARRANGE INFORMATION OF EACH DISPLAY AREA ~S108

ARRANGE SYMBOL OF EACH ELEMENT INCLUDED IN SERIES OF ROUTINES ASSOCIATED WITH DIFFICULTY LEVEL IN CHRONOLOGICAL ORDER ~S109

CHANGE DIFFICULTY LEVEL CORRESPONDING TO UNSUCCESSFUL ELEMENT TO CROSS MARK ~S110

DISPLAY DIFFICULTY LEVEL OF ELEMENT NOT TO BE USED FOR SCORING IN GRAY ~S111

DISPLAY SCORING INFORMATION USING DISPLAY UNIT AND REPRODUCE VIDEO INFORMATION AND 3D ANIMATION ~S112

END

FIG. 14

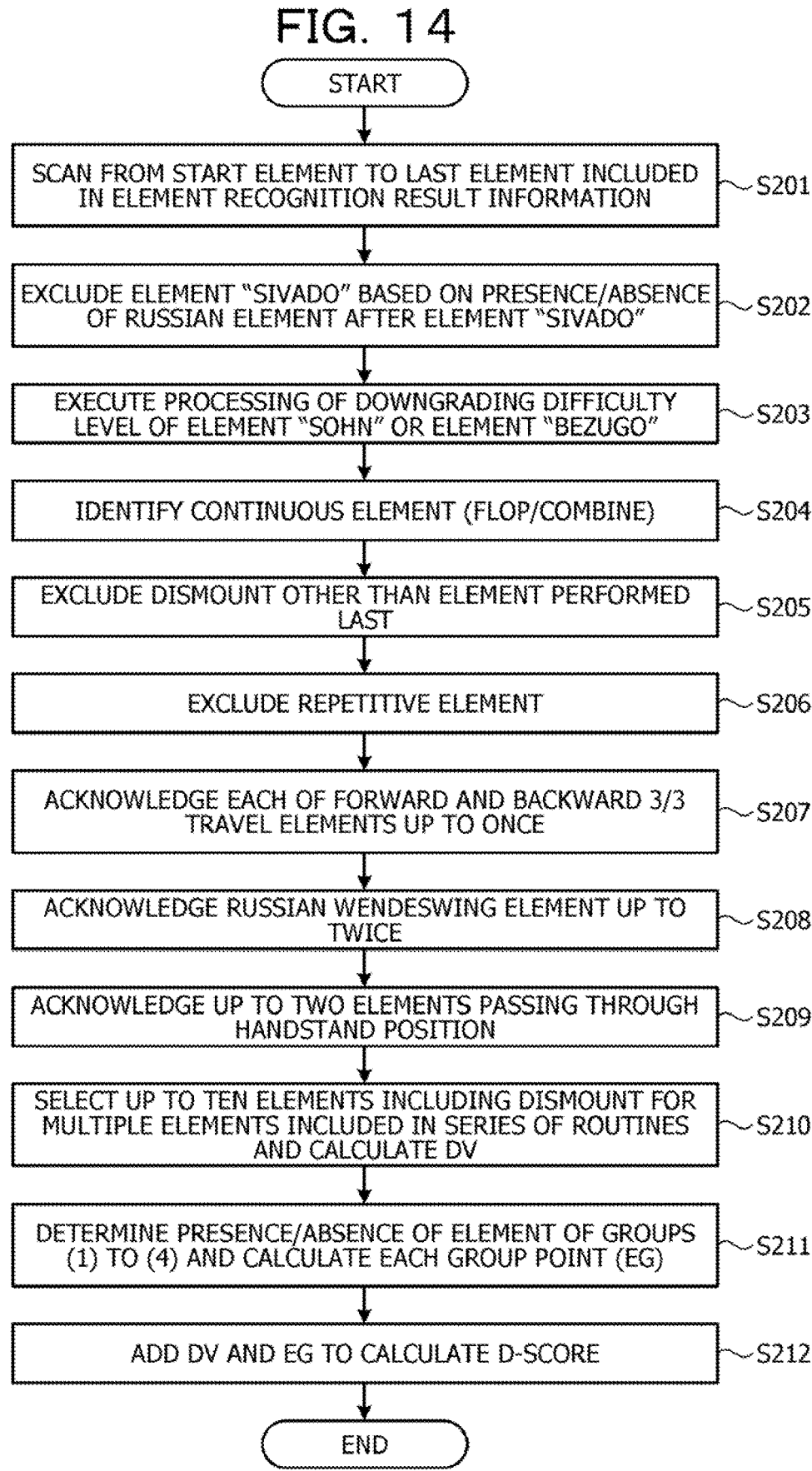

START

SCAN FROM START ELEMENT TO LAST ELEMENT INCLUDED IN ELEMENT RECOGNITION RESULT INFORMATION — S201

EXCLUDE ELEMENT "SIVADO" BASED ON PRESENCE/ABSENCE OF RUSSIAN ELEMENT AFTER ELEMENT "SIVADO" — S202

EXECUTE PROCESSING OF DOWNGRADING DIFFICULTY LEVEL OF ELEMENT "SOHN" OR ELEMENT "BEZUGO" — S203

IDENTIFY CONTINUOUS ELEMENT (FLOP/COMBINE) — S204

EXCLUDE DISMOUNT OTHER THAN ELEMENT PERFORMED LAST — S205

EXCLUDE REPETITIVE ELEMENT — S206

ACKNOWLEDGE EACH OF FORWARD AND BACKWARD 3/3 TRAVEL ELEMENTS UP TO ONCE — S207

ACKNOWLEDGE RUSSIAN WENDESWING ELEMENT UP TO TWICE — S208

ACKNOWLEDGE UP TO TWO ELEMENTS PASSING THROUGH HANDSTAND POSITION — S209

SELECT UP TO TEN ELEMENTS INCLUDING DISMOUNT FOR MULTIPLE ELEMENTS INCLUDED IN SERIES OF ROUTINES AND CALCULATE DV — S210

DETERMINE PRESENCE/ABSENCE OF ELEMENT OF GROUPS (1) TO (4) AND CALCULATE EACH GROUP POINT (EG) — S211

ADD DV AND EG TO CALCULATE D-SCORE — S212

END

FIG. 16

METHOD OF COMPETITION SCORING, NON-TRANSITORY COMPUTER READABLE RECORDING MEDIUM, AND COMPETITION SCORING APPARATUS

CROSS-REFERENCE TO RELATED APPLICATION

This application is a continuation application of International Application PCT/JP2019/029654 filed on Jul. 29, 2019 and designated the U.S., the entire contents of which are incorporated herein by reference.

FIELD

The embodiment discussed herein is related to a display method and the like.

BACKGROUND

As gymnastics, six events including floor exercises, pommel horse, rings, vault, parallel bars, and horizontal bar have been performed for men, and four events including vault, uneven parallel bars, balance beam, and floor exercises have been performed for women. In events other than vault for both men and women, a plurality of elements is consecutively performed to form one performance.

A performance score is calculated by adding a difficulty (D) score and an execution (E) score. For example, a D-score is a score calculated on the basis of success/unsuccess of an element. An E-score is a score calculated by a point-deduction system according to a perfection level of an element. The success/unsuccess of the element and the perfection level of the element are judged visually by judges based on a rule book that describes scoring rules.

Furthermore, there is a case where a performance of a gymnast is imaged by a video camera and the video is reproduced to examine each element in the performance in detail when the judges carry out scoring of the gymnastics. It is not limited to the gymnastics, but it occurs in a similar manner in other scoring competitions in which a performance of a player is scored.

International Publication Pamphlet No. WO 2019/049216 is disclosed as related art.

SUMMARY

According to an aspect of the embodiments, a display method for outputting a result of scoring for a performance of a scoring competition, the display method includes obtaining input information including an event, gender, and class classification of the scoring competition; obtaining a recognition result of a plurality of elements included in the performance based on sensing data in which an athlete of the scoring competition is sensed; determining a first rule among a plurality of types of scoring rules based on the input information; determining a difficulty level of each of the plurality of elements based on the recognition result and the first rule; limiting a target to be used for the scoring to a part of the plurality of elements according to the difficulty level of each of the plurality of elements; and outputting a scoring screen that includes a first display area, a second display area, third display area, and a fourth display area, the first display area displaying the plurality of elements and the difficulty level of each of the elements, the second display area being an area for an aggregate result of a number of elements of each difficulty level for the limited part of the elements, the third display area being an area for a score of the performance directed to the limited part of the elements, the fourth display area being area for a 3D model of the athlete generated on the basis of the sensing data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram illustrating an exemplary data structure of element recognition result information;

FIG. 5 is a diagram illustrating an exemplary data structure of a difficulty level definition table;

FIG. 6 is a diagram illustrating an exemplary data structure of a group definition table;

FIG. 7 is a diagram illustrating an exemplary data structure of a rule table;

FIG. 8 is a diagram (1) illustrating an exemplary preprocessing result;

FIG. 9 is a diagram (2) illustrating an exemplary preprocessing result;

FIG. 13 is a flowchart illustrating a processing procedure of the information processing apparatus according to the present embodiment;

FIG. 14 is a flowchart (1) of a process of calculating a D-score on the basis of a scoring rule;

FIG. 16 is a diagram (3) illustrating an exemplary scoring screen; and

DESCRIPTION OF EMBODIMENTS

In a scoring competition, rules for calculating a performance score differ depending on conditions such as an event, gender, tournament type, age, and the accuracy of the performance score largely depends on the ability of judges. For example, while a certain element is determined as a difficulty level A in the senior tournament standard, it is determined as a difficulty level B in the junior tournament. Furthermore, there is an element whose score is higher in the junior tournament than in the senior tournament even if it is the element of the same difficulty level. Moreover, some female elements are classified into "acrobatics type" or "dance type" in addition to the difficulty level, and there is a rule to exclude an element from a scoring target when only one of "acrobatics type" or "dance type" is performed. The classification of "acrobatics type" and "dance type" does not exist in a performance of men.

Note that, while the judges are enabled to review the performance by simply reproducing the video as in the conventional techniques described above, the judges themselves are in need of accurately knowing the rules corresponding to the conditions such as the event, gender, tournament type, age, described above.

However, it is a heavy burden for the judges to comprehensively grasp the rules corresponding to the conditions. Therefore, there has been a need for supporting the judges by presenting, to the judges, information to be the basis for calculating the performance score based on the rules corresponding to the conditions.

In one aspect, the present embodiment aims to provide a display method, a display program, and an information processing apparatus capable of displaying information to be the basis for calculating a performance score based on rules corresponding to conditions.

Hereinafter, an embodiment of a display method, a display program, and an information processing apparatus will be described in detail with reference to the drawings. Note that the embodiment is not limited to the present embodiment.

EMBODIMENT

Figure 1:
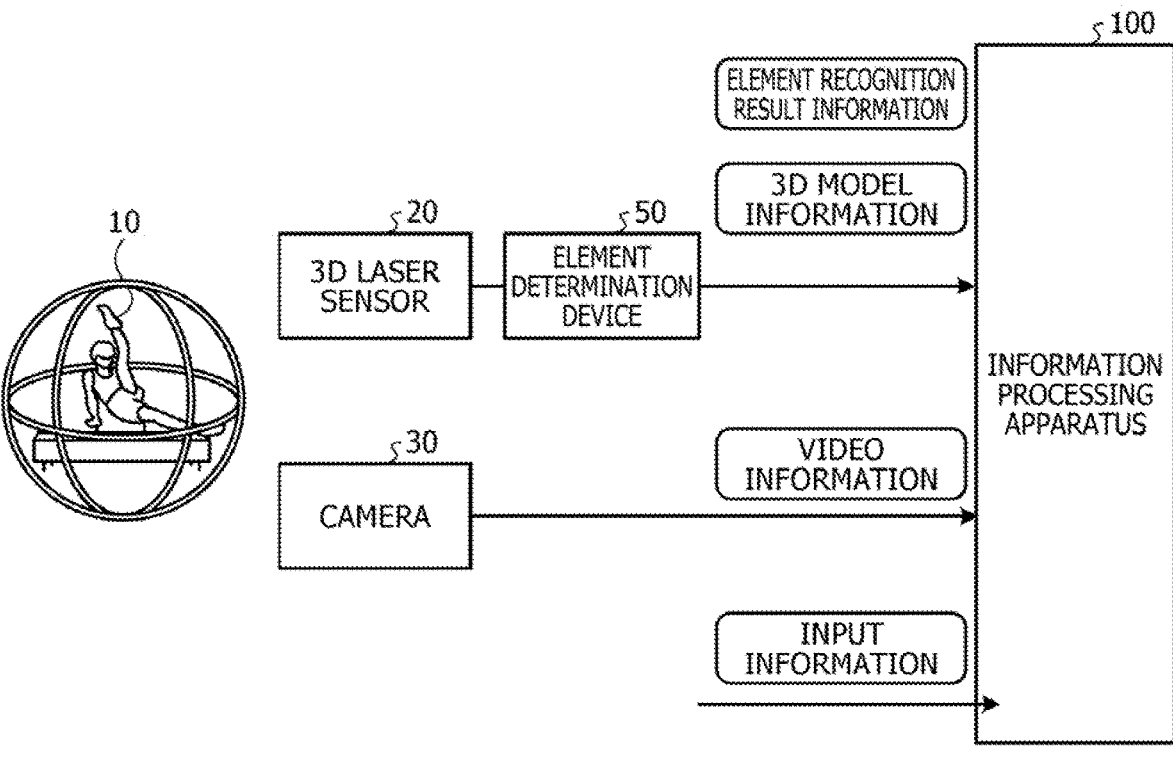
FIG. 1 is a diagram illustrating an exemplary system according to the present embodiment.

FIG. 1 is a diagram illustrating an exemplary system according to the present embodiment. As illustrated in FIG. 1, this system includes a three-dimensional (3D) laser sensor 20, a camera 30, an element determination device 50, and an information processing apparatus 100. The 3D laser sensor 20 is coupled to the element determination device 50. The information processing apparatus 100 is coupled to the element determination device 50 and the camera 30.

A gymnast 10 performs a predetermined performance to be scored in front of the 3D laser sensor 20 and the camera 30. While a case where the gymnast 10 performs a gymnastics performance will be described in the present embodiment as an example, it may be applied to other scoring competitions in a similar manner. The gymnast 10 is an example of an athlete.

For example, other scoring competitions include trampoline, swim diving, figure skating, karate style, ballroom dance, snowboarding, skateboarding, ski aerial, and surfing. Furthermore, it may also be applied to form check of classical ballet, ski jump, mogul air, turn, baseball, and basketball, and the like. Furthermore, it may also be applied to competitions such as kendo, judo, wrestling, and sumo. Moreover, it may also be used to evaluate whether or not a weight lifting barbell has been lifted.

The 3D laser sensor 20 is a sensor that performs 3D sensing for the gymnast 10. The 3D laser sensor 20 outputs sensor information as a sensing result to the element determination device 50.

For example, the sensor information includes a plurality of frames in chronological order, and a frame number that uniquely identifies a frame is assigned to each frame in ascending order. Each frame contains distance information from the 3D laser sensor 20 to each point on the gymnast 10. With the sensor information used, it becomes possible to estimate a three-dimensional position of each joint of the gymnast 10 in each frame, and to generate a 3D model of the gymnast 10.

The camera 30 is a camera that captures video of the gymnast 10. The camera 30 outputs the captured video information to the information processing apparatus 100. The video information includes a plurality of pieces of image information in chronological order. The image information included in the video information is referred to as an image frame. A frame number that uniquely identifies an image frame is assigned to each image frame included in the video information in ascending order. It is assumed that the frame number of each frame included in the sensor information and the frame number of each image frame included in the video information are in synchronization with each other.

The element determination device 50 is a device that determines an element included in the performance on the basis of the senor information. For example, the element determination device 50 estimates a three-dimensional position of each joint of the gymnast 10 in each frame on the basis of the sensor information, thereby generating a 3D model of the gymnast 10. The element determination device 50 recognizes an element on the basis of the transition of each skeleton position of the 3D model and a determination table that defines an element type based on the skeleton transition, thereby generating element recognition result information. The element determination device 50 also determines whether or not the gymnast 10 has fallen. The element determination device 50 outputs the element recognition result information and 3D model information to the information processing apparatus 100. Note that the element determination device may be constructed by a computer same as that of the information processing apparatus 100.

FIG. 2 is a diagram illustrating an exemplary data structure of the element recognition result information. As illustrated in FIG. 2, the element recognition result information associates element identification information, a start frame number, an end frame number, and presence/absence of a fall with each other. The element identification information is information that uniquely identifies an element included in the performance. The start frame number indicates the frame number at which the element identified by the element identification information has started. The end frame number indicates the frame number at which the element identified by the element identification information has been complete. The presence/absence of a fall indicates whether or not the gymnast 10 has fallen. When the gymnast has fallen during the element, the presence/absence of a fall is "presence". Note that, while the frame number is a frame number of the 3D laser sensor 20, it may be time information indicating the sensing time.

The 3D model information includes shape information of each part included in the 3D model, and transition information of the skeleton position of the 3D model. For example, the transition information is information in which the frame number is associated with the skeleton position of the 3D model. It is assumed that the frame number of the 3D model information is in synchronization with the frame number of the sensor information and the frame number of the video information described above. Note that, the skeletal position includes positions of a plurality of joints.

Note that, the element determination device 50 may determine the element of the gymnast 10 on the basis of the technique disclosed in International Publication Pamphlet No. WO 2019/049216 or the like.

The information processing apparatus 100 receives input information from an external device (not illustrated) and an input unit (not illustrated). The input information includes information associated with the event of the performance given by the gymnast 10, the gender of the gymnast 10, and the class classification of the gymnast 10. For example, the event of the performance includes any one of events including rings, pommel horse, vault, balance beam, parallel bars, horizontal bar, floor, and uneven parallel bars. The gender of the gymnast is to be male or female. The class classification is to be senior or junior. The input information may include information regarding a tournament type. Note that the external device is, for example, a terminal device to be operated by a judge, a terminal device for checking the performance at the time of training, and the like.

Here, the information processing apparatus 100 determines a scoring rule corresponding to the input information among a plurality of types of scoring rules. On the basis of the determined scoring rule, the information processing apparatus 100 determines a difficulty level of the elements, narrows down the elements to be used for scoring, and generates and displays a scoring screen.

Figure 3:
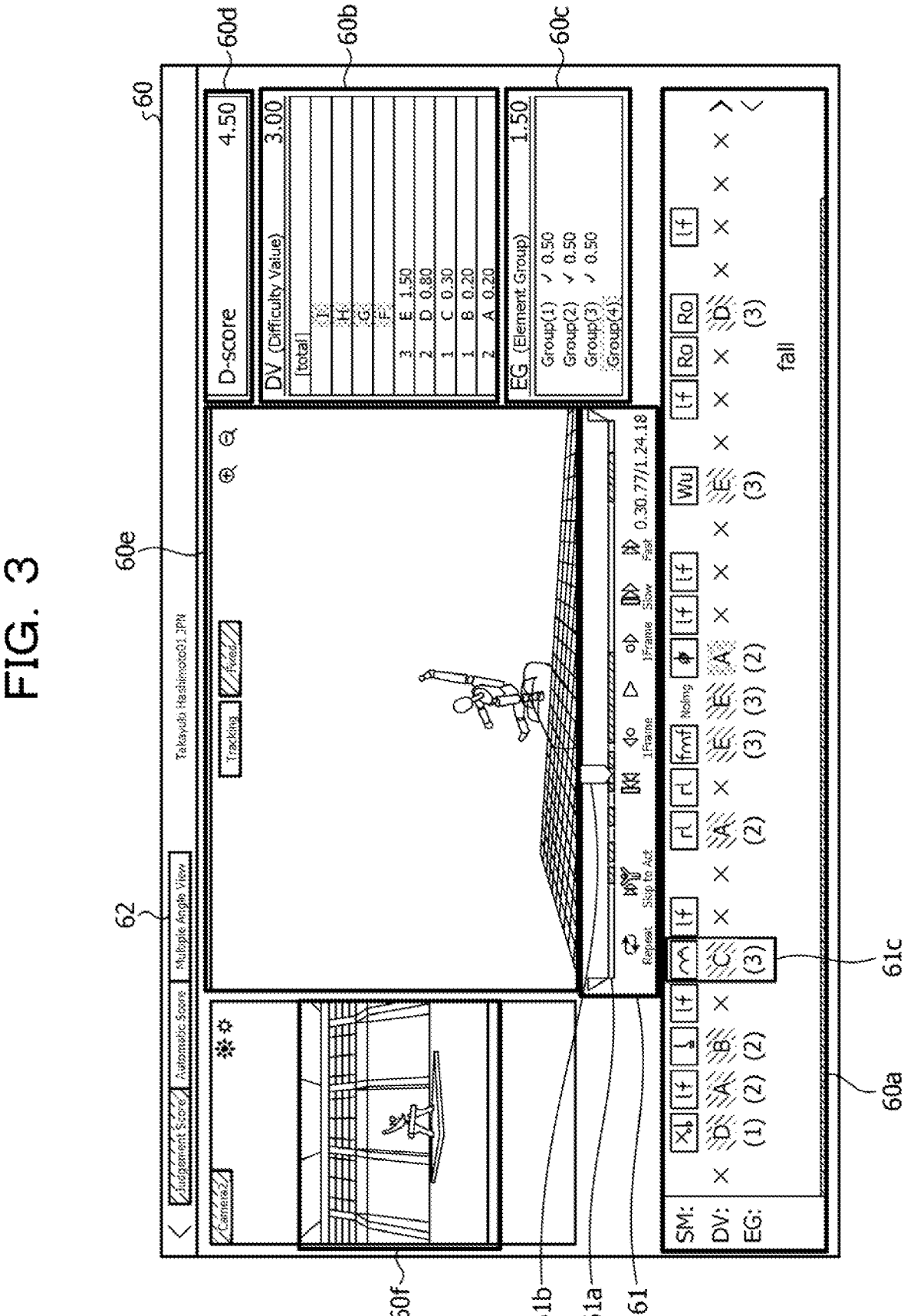
FIG. 3 is a diagram (1) illustrating an exemplary scoring screen.

FIG. 3 is a diagram (1) illustrating an example of the scoring screen. For example, a scoring screen 60 illustrated in FIG. 3 is a screen generated on the basis of the scoring rule corresponding to the input information of the performance event "pommel horse", the gender "male", and the class classification "senior". The scoring screen 60 includes display areas 60a to 60f and a control panel area 61.

The display area 60a is an area for displaying, in chronological order, respective types of elements included in the performance, difficulty levels of the elements, and groups into which the elements are classified. The display area 60a corresponds to a "first display area". A type of the element is displayed by a symbol unique to the type of the element. Performed elements are displayed in chronological order in a row of a symbol mark (SM) in the display area 60a. A difficulty level of the element is indicated by one of A to I. The difficulty levels corresponding to the performed elements are displayed in chronological order in a row of a difficulty value (DV) in the display area 60a. Elements not approved to be successful are indicated by cross marks. The groups into which the elements are classified are indicated by codes for identifying groups. The groups corresponding to the performed elements are displayed in chronological order in a row of an element group (EG) in the display area 60a.

The display area 60b is an area for displaying the difficulty level of the element to be used for scoring the difficulty value (DV) and the number of performed elements classified into each difficulty level in association with each other. The display area 60b corresponds to a "second display area". The example of FIG. 3 indicates that three elements of a difficulty level E, two elements of a difficulty level D, one element of a difficulty level C, one element of a difficulty level B, and two elements of a difficulty level A are used for scoring. Assuming that an element of the difficulty level E is "0.5 points", an element of the difficulty level D is "0.4 points", an element of the difficulty level C is "0.3 points", an element of the difficulty level B is "0.2 points", and an element of the difficulty level A is "0.1 points", the DV is "3 points".

The display area 60c is an area for displaying a scoring result of an element group (EG). For example, in a case of performing an element that belongs to a group (1), 0.5 points are added to the EG. In a case of performing an element that belongs to a group (2), 0.5 points are added to the EG. In a case of performing an element that belongs to a group (3), 0.5 points are added to the EG. In a case of performing an element that belongs to a group (4), 0.5 points are added to the EG. In the example illustrated in FIG. 3, elements that belong to the groups (1) to (3) are performed, and thus the EG is "1.5 points".

The display area 60d is an area for displaying a performance score (D-score). The display area 60d corresponds to a "third display area". For example, in the scoring rule corresponding to the input information of the performance event "pommel horse", the gender "male", and the class classification "senior", the performance score is the sum of the DV score and the EG score.

The display area 60e is an area for displaying video of the 3D model of the gymnast 10. The display area 60e corresponds to a "fourth display area". In the following descriptions, the video of the 3D model will be referred to as a 3D animation as appropriate. A reproduction position of the 3D animation or the like is determined by the user specifying time-related information such as a frame number, absolute time, and relative time.

The display area 60f is an area for displaying video information captured by the camera 30.

The control panel area 61 includes, for the 3D animation displayed in the display area 60e and the video information displayed in the display area 60f, respective control buttons for playing, frame-advancing, fast-forwarding, fast-rewinding, and the like, a slide bar 61a, and a pointer 61b.

The horizontal axis of the slide bar 61a corresponds to the time from the start of the performance of the gymnast 10 to the end of the performance. For the slide bar 61a, the information processing apparatus 100 indicates the period during which the element to be used for scoring is performed with a "first color", and indicates the period during which the element to be used for scoring is not performed with a "second color". For example, the first color is set to white, and the second color is set to gray.

The pointer 61b on the slide bar 61a indicates reproduction time (frame number) of the video information displayed in the 3D animation displayed in the display area 60e. Furthermore, at the time indicated by the pointer 61b, the type of the difficulty level of the element performed by the gymnast 10 are indicated by a cursor 61c in the display area 60a. The user is enabled to specify the position of the pointer 61b by operating the input unit (not illustrated), and the information processing apparatus 100 displays a 3D animation in the display area 60e with respect to the time corresponding to the specified position of the pointer 61b. Furthermore, the information processing apparatus 100 moves the cursor 61c to a position corresponding to the type and difficulty level of the element performed at the time corresponding to the specified position of the pointer 61b.

As described above, the information processing apparatus 100 according to the present embodiment determines a scoring rule corresponding to the input information among the plurality of types of scoring rules, determines a difficulty level of the elements and narrows down the elements to be used for scoring on the basis of the determined scoring rule, and generates and displays a scoring screen. As a result, it becomes possible to display information to be the basis for calculating a performance score according to the scoring rule corresponding to the conditions of the input information.

Figure 4:
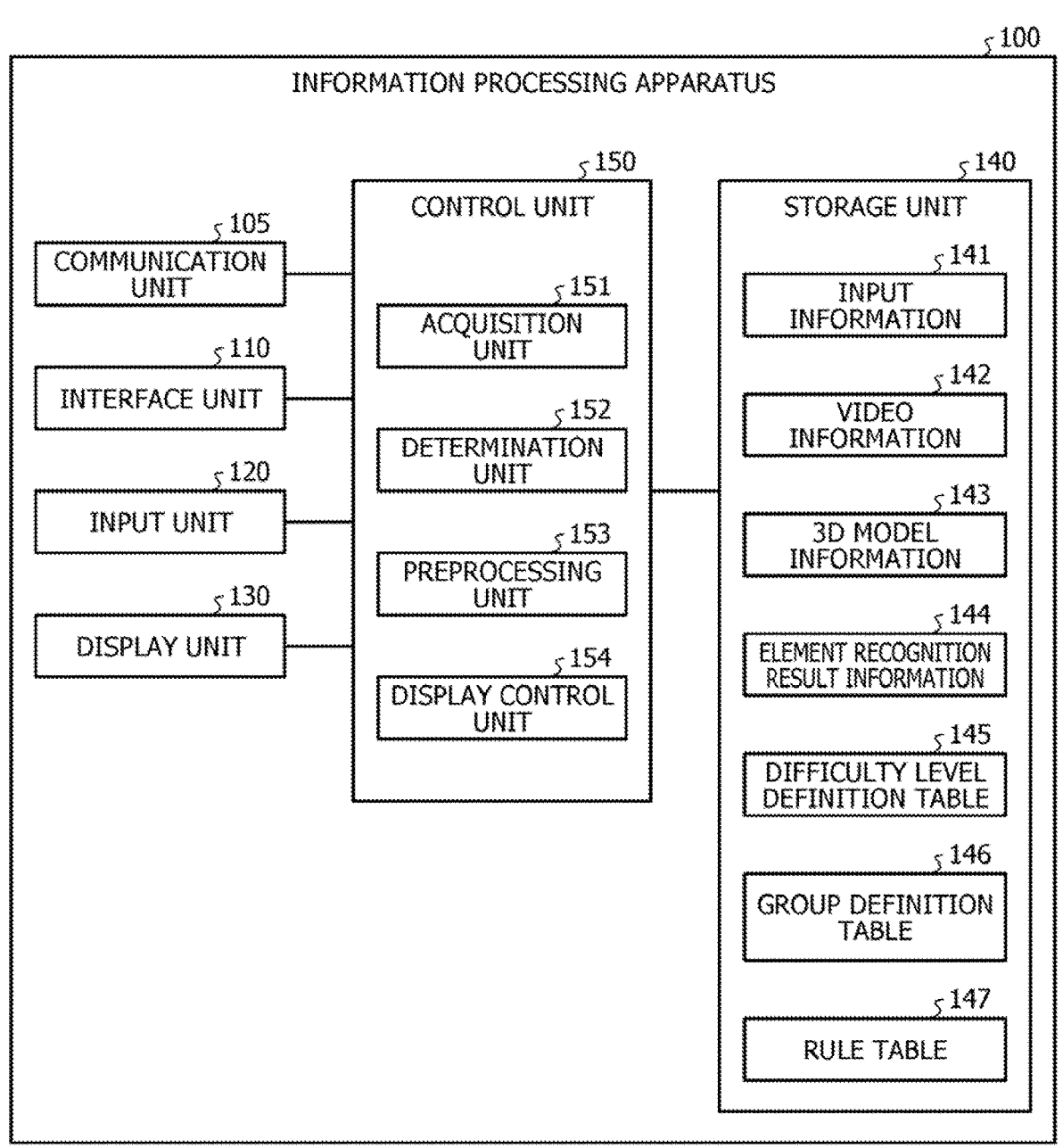
FIG. 4 is a functional block diagram illustrating a structure of an information processing apparatus according to the present embodiment.

Next, an exemplary structure of the information processing apparatus 100 illustrated in FIG. 1 will be described. FIG. 4 is a functional block diagram illustrating a structure of the information processing apparatus according to the present embodiment. As illustrated in FIG. 4, the information processing apparatus 100 includes a communication unit 105, an interface unit 110, an input unit 120, a display unit 130, a storage unit 140, and a control unit 150.

The communication unit 105 is a processing unit that performs data communication with an external device (not illustrated) via a network. The communication unit 105 is an exemplary communication device. For example, the information processing apparatus 100 receives input information via the communication unit 105.

The interface unit 110 is a processing unit coupled to the element determination device 50 and camera 30 illustrated in FIG. 1. The control unit 150 to be described later exchanges data via the interface unit 110. For example, the information processing apparatus 100 obtains, from the element determination device 50, element recognition result information and 3D model information via the interface unit 110. The information processing apparatus 100 obtains video information from the camera 30 via the interface unit 110.

The input unit 120 is an input device for inputting various types of information to the information processing apparatus 100. The input unit 120 corresponds to a keyboard, a mouse, a touch panel, and the like. For example, the user operates the input unit 120 to select the control button illustrated in FIG. 3 or to operate the position of the pointer 61*b*. Note that, the user may operate the input unit 120 to input the input information to the information processing apparatus 100.

The display unit 130 is a display device that displays information regarding a scoring screen output from the control unit 150 and the like. The display unit 130 corresponds to a liquid crystal display, an organic electro-luminescence (EL) display, a touch panel, or the like.

The storage unit 140 includes input information 141, video information 142, 3D model information 143, element recognition result information 144, a difficulty level definition table 145, a group definition table 146, and a rule table 147. The storage unit 140 corresponds to a semiconductor memory element such as a random access memory (RAM) or a flash memory, or a storage device such as a hard disk drive (HDD).

The input information 141 includes information needed to uniquely determine a scoring rule, and includes, for example, information regarding the event of the performance performed by the gymnast 10, the gender of the gymnast 10, and the class classification of the gymnast 10. For example, the event of the performance includes any one of events including rings, pommel horse, vault, balance beam, parallel bars, horizontal bar, floor, and uneven parallel bars. The gender of the gymnast is to be male or female. The class classification is to be senior or junior.

The video information 142 is information regarding the video captured by the camera 30. The video information includes a plurality of image frames in chronological order. A frame number is assigned to each image frame.

The 3D model information 143 includes shape information of each part included in the 3D model, and transition information of each skeleton position of the 3D model. For example, the transition information is information in which the frame number is associated with each skeleton position of the 3D model.

The element recognition result information 144 corresponds to the element recognition result information described with reference to FIG. 2. As described with reference to FIG. 2, the element recognition result information 144 associates element identification information, a start frame number, an end frame number, and presence/absence of a fall with each other.

The difficulty level definition table 145 is a table that defines a difficulty level of each element. FIG. 5 is a diagram illustrating an exemplary data structure of the difficulty level definition table. As illustrated in FIG. 5, the difficulty level definition table 145 associates element identification information with a difficulty level. The difficulty level of the element corresponding to the element identification information is one of A to I. The difficulty level of A is the lowest, and the difficulty level increases in the order of A, B, C, D, E, F, G, H, and I.

The group definition table 146 is a table that defines a group to which each element belongs. FIG. 6 is a diagram illustrating an exemplary data structure of the group definition table. As illustrated in FIG. 6, the group definition table 146 associates element identification information with a group to which the element belongs. Although illustration is omitted, the group definition table 146 retains information in which the element identification information is associated with composition requirements (CR) to which the element belongs.

The rule table 147 is a table that retains scoring rules corresponding to conditions of input information. FIG. 7 is a diagram illustrating an exemplary data structure of the rule table. As illustrated in FIG. 7, the rule table 147 associates conditions with a scoring rule. The conditions include an event, gender, and class classification. Information regarding a unique scoring rule is identified according to a combination of the event, gender, and class classification.

Here, while the difficulty level of the element indicated by the element identification information included in the element recognition result information 144 is defined in the difficulty level definition table 145, it may be changed to another element (combined element) depending on the order of the elements, the combination of the elements, and the like, the difficulty level may increase or decrease, or it may be excluded from the scoring target. This rule is defined by the scoring rule in the rule table 147. According to the scoring rule, the difficulty level is upgraded and the difficulty level is downgraded depending on the predetermined order of the elements, the combination of the elements, the number of the elements, and postures before and after the performance of the element. Furthermore, the scoring rule defines whether or not an element is successful according to the predetermined order of the elements, the combination of the elements, the number of the elements, and the like. Each scoring rule is unique on the basis of an event, gender, and class classification.

According to the scoring rule, in the case of seniors, the total score of difficulty levels of ten elements (nine elements with the highest difficulty level and a dismount) is set as a DV score. However, according to the scoring rule, when multiple elements belonging to the same group are performed in the case of seniors, up to five elements are considered to be valid. The dismount is defined in advance by the scoring rule for each event.

According to the scoring rule, in the case of juniors, difficulty levels of eight elements (seven elements with the highest difficulty level and the dismount) are targeted for scoring. Note that, even in the case of the same element, the difficulty level of the element defined by the junior scoring rule may be different from the difficulty level of the element defined by the senior scoring rule.

An example of an event-specific scoring rule will be described. For example, in the case of the event "rings", there is a unique scoring rule that elements of groups (1) and (3) are not allowed to continue four consecutive times and the difficulty levels are not acknowledged while three consecutive elements may be performed again after three consecutive elements as long as there is an element of the group (1) with equal to or higher than the difficulty level B. In the case of the event "pommel horse", there is a scoring rule that the difficulty level of the element is lowered by two levels when the element "Sohn" and the element "Bezugo" are performed from the standing position (without turning). Although description is omitted, according to the scoring rule, the difficulty level is upgraded and the difficulty level is downgraded depending on the predetermined order of the elements, the combination of the elements, the number of the elements, and postures before and after the performance of the element with respect to other events as well. With respect to other events as well, the scoring rule defines whether or not an element is successful according to the predetermined order of the elements, the combination of the elements, the number of the elements, and the like. According to the scoring rule, multiple elements are changed to one element (combined element) depending on the predetermined order of the elements unique to the event and the combination of the elements unique to the event.

According to the scoring rule corresponding to the gender "female", each element is classified into an acrobatics-type element or a dance-type element. According to the scoring rule for women, a connection value (CV) and a series bonus (SB) are given depending on the combination of the acrobatics-type elements. Furthermore, a connection value is given depending on the combination of the dance-type elements.

Describing examples of the CV and SB in the element of the "acrobatics type", "0.1" is given as the CV when an element of a difficulty level C is performed twice consecutively. When an element of a difficulty level B and an element of a difficulty level E are consecutively performed, "0.1" is given as the CV. When an element of the difficulty level B and an element of a difficulty level D are consecutively performed, "0.2" is given as the CV. When an element of the difficulty level B and an element of a difficulty level F are consecutively performed, "0.2" is given as the CV. When elements of the difficulty level B, difficulty level B, and difficulty level C are consecutively performed, "0.1" is given as the SB. Note that, when an element of the difficulty level C is performed three consecutive times, "0.2" is given as the CV, and "0.1" is further given as the SB.

An example of the CV in an element of the "dance type" will be described. When an element of the difficulty level C and an element of equal to or higher than the difficulty level C are consecutively performed, "0.1" is given as the CV. When an element of the difficulty level A and an element of the difficulty level C are consecutively performed, "0.1" is given as the CV. When an element of the difficulty level D and an element of equal to or higher than the difficulty level D are consecutively performed, "0.2" is given as the CV.

Note that, in the scoring rule for women, there is a condition that equal to or more than a certain percentage of the acrobatics-type elements and the dance-type elements are included in the elements to be scored as a condition for selecting an element to be scored.

According to the scoring rule corresponding to the gender "male", each element is classified into any of groups (1) to (4), and an element group (EG) score is given. When an element belonging to the group (1) is performed, "0.5" is given. When an element belonging to the group (2) is performed, "0.5" is given. When an element belonging to the group (3) is performed, "0.5" is given. When an element belonging to the group (4) is performed, "0.5" is given. A relationship between the element identification information of each element and the group is defined in the group definition table 146 illustrated in FIG. 6.

According to the scoring rule corresponding to the gender "female", each element is classified into any of CR1 to CR4, and the CR is given. When an element belonging to the CR1 is performed, "0.5" is given. When an element belonging to the CR2 is performed, "0.5" is given. When an element belonging to the CR3 is performed, "0.5" is given. When an element belonging to the CR4 is performed, "0.5" is given.

Elements belonging to the CR1 correspond to a combination of at least two different dance-type elements including at least one of 180-degree straddle or left-right split leap or a jump. Elements belonging to the CR2 are the elements belonging to the group (2). Elements belonging to the CR3 correspond to acrobatics-type series elements including elements involving at least two aerial phases including one somersault. Elements belonging to the CR4 correspond to acrobatics-type elements in different directions. Although illustration is omitted, it is assumed that the CR1 to CR4 and the element identification information of each element are further defined in the group definition table 146.

The description returns to FIG. 4. The control unit 150 includes an acquisition unit 151, a determination unit 152, and a preprocessing unit 153. The control unit 150 may be implemented by a central processing unit (CPU), a micro processing unit (MPU), or the like. Furthermore, the control unit 150 may also be implemented by a hard wired logic such as an application specific integrated circuit (ASIC) or a field programmable gate array (FPGA).

The acquisition unit 151 is a processing unit that obtains various types of information. The acquisition unit 151 obtains the input information 141 from the communication unit 105 and the input unit 120, and stores the obtained input information 141 in the storage unit 140. The acquisition unit 151 obtains the video information 142 from the camera 30 via the interface unit 110, and stores the obtained video information 142 in the storage unit 140. The acquisition unit 151 obtains the 3D model information 143 and the element recognition result information 144 from the element determination device 50 via the interface unit 110, and stores the obtained 3D model information 143 and element recognition result information 144 in the storage unit 140.

The determination unit 152 is a processing unit that determines a scoring rule on the basis of the input information 141. The determination unit 152 compares the input information 141 with the conditions in the rule table 147, and determines a scoring rule corresponding to the event, gender, and class classification included in the input information 141. The determination unit 152 outputs information regarding the determined scoring rule to the preprocessing unit 153.

The preprocessing unit 153 determines a difficulty level of each element included in the performance on the basis of the scoring rule and the element recognition result information 144. The preprocessing unit 153 limits the target to be used for scoring to a part of a plurality of elements according to the difficulty level of each of the plurality of elements included in the performance. The preprocessing unit 153 calculates a score of the performance on the basis of the limited partial elements and the difficulty level of the element.

An exemplary process in which the preprocessing unit 153 determines a difficulty level of each element included in the performance will be described. The scoring rule includes a rule for converting a combination of predetermined elements into one element (combined element). The preprocessing unit 153 scans each element (element identification information) included in the element recognition result information 144, and in a case of detecting a combination of predetermined elements defined in the scoring rule, converts it into one element. The preprocessing unit 153 leaves elements as they are for the elements that do not correspond to the combination of predetermined elements. The preprocessing unit 153 obtains the difficulty level of each element from the difficulty level definition table 145.

Furthermore, in the scoring rule, success of some elements may not be acknowledged under predetermined conditions. For example, in a case where the same element is performed multiple times, the preprocessing unit 153 acknowledges, among a plurality of elements, the success of the element performed first and considers the remaining elements to be failed on the basis of the scoring rule. Although description is omitted, the scoring rule includes other conditions for not acknowledging success of the element.

The preprocessing unit 153 executes the process described above to update the element recognition result information 144. For example, in a case where a first element and a subsequent second element are converted into one third element, the preprocessing unit 153 sets the start frame number of the first element to the start frame of the third element, and sets the end frame number of the second element to the end frame number of the third element.

Next, an exemplary process in which the preprocessing unit 153 limits the target to be used for scoring to a part of a plurality of elements according to the difficulty level of each of the plurality of elements included in the performance will be described. For example, in a case where the scoring rule corresponds to the gender "male" and the class classification "senior", the preprocessing unit 153 scans the updated element recognition result information 144, and sets ten elements (nine elements with the highest difficulty level and the dismount) as the target to be used for scoring. In a case where the scoring rule corresponds to the gender "female" and the class classification "senior", the preprocessing unit 153 includes equal to or more than a predetermined number of acrobatics-type elements and dance-type elements in the ten elements described above.

In a case where the scoring rule corresponds to the gender "male" and the class classification "junior", the preprocessing unit 153 scans the updated element recognition result information 144, and sets eight elements (seven elements with the highest difficulty level and the dismount) as the target to be used for scoring. In a case where the scoring rule corresponds to the gender "male" and the class classification "junior", equal to or more than a predetermined number of acrobatics-type elements and dance-type elements are included in the eight elements described above.

Next, an exemplary process in which the preprocessing unit 153 calculates a score of the performance on the basis of the limited partial elements and the difficulty level of the element will be described. For example, in a case where the scoring rule corresponds to the gender "male", the preprocessing unit 153 calculates a DV and EG and sums the DV and EG, thereby calculating a D-score.

An exemplary process in which the preprocessing unit 153 calculates a DV of the scoring rule for men will be described. The preprocessing unit 153 sums the values according to the difficulty level of the element to be used for scoring, thereby calculating a DV. For example, an element of the difficulty level E is "0.5 points", an element of the difficulty level D is "0.4 points", an element of the difficulty level C is "0.3 points", an element of the difficulty level B is "0.2 points", and an element of the difficulty level A is "0.1 points". In a case where the elements to be used for scoring are three elements of the difficulty level E, two elements of the difficulty level D, one element of the difficulty level C, one element of the difficulty level B, and two elements of the difficulty level A, the DV is "3 points".

An exemplary process in which the preprocessing unit 153 calculates an EG will be described. The preprocessing unit 153 scans the updated element recognition result information 144, and determines whether or not the elements belonging to the respective groups (1) to (4) are performed on the basis of the group definition table 146. In a case of performing an element that belongs to the group (1), the preprocessing unit 153 adds "0.5 points" to the EG. In a case of performing an element that belongs to the group (2), the preprocessing unit 153 adds "0.5 points" to the EG. In a case of performing an element that belongs to the group (3), the preprocessing unit 153 adds "0.5 points" to the EG. In a case of performing an element that belongs to the group (4), the preprocessing unit 153 adds "0.5 points" to the EG.

Meanwhile, in a case where the scoring rule corresponds to the gender "female", the preprocessing unit 153 calculates a DV, CR, and CV and sums the DV, CR, and CV, thereby calculating a D-score. A process in which the preprocessing unit 153 calculates the DV of the scoring rule for women is similar to the process of calculating the DV of the scoring rule for men described above. However, elements of women are classified into acrobatics-type elements and dance-type elements in addition to the difficulty level.

An exemplary process in which the preprocessing unit 153 calculates CR will be described. The preprocessing unit 153 scans the updated element recognition result information 144, and determines whether or not the elements belonging to the respective CR1 to CR4 are performed on the basis of the group definition table 146. In a case of performing an element that belongs to the CR1, the preprocessing unit 153 adds "0.5 points" to the CR. In a case of performing an element that belongs to the CR2, the preprocessing unit 153 adds "0.5 points" to the CR. In a case of performing an element that belongs to the CR3, the preprocessing unit 153 adds "0.5 points" to the CR. In a case of performing an element that belongs to the CR4, the preprocessing unit 153 adds "0.5 points" to the CR.

An exemplary process in which the preprocessing unit 153 calculates a CV will be described. The preprocessing unit 153 scans the updated element recognition result information 144, and determines whether or not there is a predetermined combination of elements for giving a CV defined in the corresponding scoring rule. In a case where there is a predetermined combination of elements for giving a CV defined in the scoring rule, the preprocessing unit 153 calculates a CV corresponding to the element combination. Note that, regardless of whether or not it is an element to be used for scoring, a CV gives a score corresponding to the CV as long as there is a predetermined combination of elements for giving the CV defined in the scoring rule. With respect to the SB as well, in a case where there is a predetermined combination of elements for giving the SB defined in the corresponding scoring rule, the preprocessing unit 153 gives the score corresponding to the SB.

The preprocessing unit 153 executes the process described above to generate a preprocessing result, and outputs the preprocessing result to the display control unit 154. Note that the preprocessing unit 153 may store information regarding the preprocessing result in the storage unit 140. With the information regarding the preprocessing result stored in the storage unit 140, it may be used as evidence. Note that, in a case where a button for allowing the user to instruct "confirmation" of the scoring result is also provided on the scoring screen, the preprocessing unit 153 may store the information regarding the preprocessing result as a scoring result when the input of "confirmation" is received from the user (e.g., a judge). Moreover, the preprocessing unit 153 stores the scoring result and the target sensing data in association with each other.

FIG. 8 is a diagram (1) illustrating an example of the preprocessing result. For example, FIG. 8 illustrates an example of the preprocessing result generated on the basis of the scoring rule corresponding to the event "pommel horse", the gender "male", and the class classification "senior". As illustrated in FIG. 8, this preprocessing result 200 includes a table 200A and score calculation result information 200B.

The table 200A associates element identification information, a start frame number, an end frame number, an unsuccess flag, a scoring target flag, presence/absence of a fall, a difficulty level, and a group with each other. Descriptions related to the element identification information, the start frame number, the end frame number, and the presence/absence of a fall are similar to the descriptions given in FIG. 2. The unsuccess flag is information indicating whether or not the element corresponding to the element identification information is successful, and is turned "on" in a case of being unsuccessful. The scoring target flag is information indicating the element to be scored for the D-score, and is turned "on" in a case of being targeted for scoring. The difficulty level and the group indicate a difficulty level and a group correspond to the element.

The score calculation result information 200B includes information regarding the D-score, DV, and EG. The information regarding the DV includes a breakdown of the difficulty level of the element targeted for scoring in addition to the DV score. The information regarding the EG includes information indicating whether or not the element corresponding to the group exists for each group in addition to the EG score.

FIG. 9 is a diagram (2) illustrating an example of the preprocessing result. FIG. 9 illustrates an example of the preprocessing result generated on the basis of the scoring rule corresponding to the event "balance beam", the gender "female", and the class classification "senior". As illustrated in FIG. 9, this preprocessing result 201 includes a table 201A and score calculation result information 201B.

The table 201A associates element identification information, a start frame number, an end frame number, an unsuccess flag, a scoring target flag, presence/absence of a fall, a difficulty level, and classification with each other. Descriptions related to the element identification information, the start frame number, the end frame number, and the presence/absence of a fall are similar to the descriptions given in FIG. 2. Descriptions related to the unsuccess flag, the scoring target flag, and the difficulty level are similar to the descriptions given in the table 200A described above. The classification indicates whether the corresponding element is classified into the acrobatics type or the dance type.

The score calculation result information 201B includes information regarding the D-score, CR, and CV. The information regarding the DV includes a breakdown of the difficulty level of the element targeted for scoring, acrobatics-type element, and dance-type element in addition to the DV score. The information regarding the CR includes information indicating whether or not the element belonging to the CR exists for each CR in addition to the CR score. The information regarding the CV includes a combination of elements corresponding to the CV and a CV score.

The description returns to FIG. 4. The display control unit 154 is a processing unit that generates information regarding the scoring screen on the basis of the information regarding the preprocessing result obtained from the preprocessing unit 153. The scoring screen includes a first display area, a second display area, a third display area, and a fourth display area. The display control unit 154 outputs the generated information regarding the scoring screen to the display unit 130, and causes it to be displayed.

For example, the display control unit 154 generates the scoring screen 60 described with reference to FIG. 3 using the information regarding the preprocessing result 200 described with reference to FIG. 8. The preprocessing result described with reference to FIG. 8 is, for example, information generated on the basis of the scoring rule corresponding to the performance event "pommel horse", the gender "male", and the class classification "senior".

As described with reference to FIG. 3, the scoring screen 60 includes the display areas 60a to 60f. The display control unit 154 generates information regarding the display area 60a on the basis of the table 200A of the preprocessing result 200. The display control unit 154 sets information for displaying, in chronological order, respective types of elements included in the performance, difficulty levels of the elements, and groups into which the elements are classified with respect to the display area 60a. The display control unit 154 displays an element type using a symbol. The display control unit 154 identifies the symbol of the element type using a table (not illustrated) in which element identification information and a symbol are associated with each other.

The display control unit 154 controls display of a difficulty level to be displayed in the display area 60a in chronological order on the basis of the table 200A. The display control unit 154 displays a difficulty level of the element at which the unsuccess flag is turned "on" using a "cross mark". The display control unit 154 displays the difficulty level at which the scoring target flag is turned "on" with emphasis over the difficulty level at which the scoring target flag is not turned "on". For example, the display control unit 154 displays the difficulty level at which the scoring target flag is not turned "on" in gray. The display control unit 154 displays "fall" in the display area 60a for the element in which the presence/absence of a fall is "presence".

The display control unit 154 generates information regarding the display areas 60b, 60c, and 60d on the basis of the score calculation result information 200B of the preprocessing result 200. The display control unit 154 sets, in the display area 60b, information in which the difficulty level of the element to be used for DV scoring and the number of difficulty levels are associated with each other on the basis of the score calculation result information 200B. Furthermore, the display control unit 154 sets the DV score in the display area 60b.

The display control unit 154 sets, in the display area 60c, information regarding each of the groups (1) to (4) and whether or not the element corresponding to each group has been performed on the basis of the score calculation result information 200B. Furthermore, the display control unit 154 sets the EG score in the display area 60c.

The display control unit 154 sets information regarding the D-score in the display area 60d on the basis of the score calculation result information 2006.

The display control unit 154 obtains the 3D model information 143 from the storage unit 140, and causes the 3D animation based on the 3D model information 143 to be displayed in the display area 60e. In a case of displaying the 3D animation in the display area 60e, the display control unit 154 may switch between securing (fixing) the space of the display area 60e or moving (tracking) the space around the position of the gymnast 10 depending on the event of the performance. In the case of fixing, for example, the space is fixed around an apparatus.

For example, in a case where the event of the competition is any of rings, pommel horse, horizontal bar, and uneven parallel bars, the display control unit 154 fixes the space for displaying the 3D animation. On the other hand, in a case where the event is any of vault, balance beam, parallel bars, and floor, the display control unit 154 moves the space for displaying the 3D animation in synchronization with the 3D model. Tracking is preferable in the competition where movement of the athlete is large. On the other hand, fixing is preferable in the competition where movement of the gymnast is small.

The display control unit 154 obtains the video information 142 from the storage unit 140, and causes the video information to be displayed in the display area 60 *f*.

The display control unit 154 generates respective control buttons for playing, frame-advancing, fast-forwarding, fast-rewinding, and the like, the slide bar 61*a*, and the pointer 61*b*, and sets them in the control panel area 61. For the slide bar 61*a*, the display control unit 154 indicates the period during which the element to be used for scoring is performed with a "first color", and indicates the period during which the element to be used for scoring is not performed with a "second color" on the basis of the table 200A. For example, the first color is set to white, and the second color is set to gray.

The user operates the input unit 120 to press the respective control buttons, and the display control unit 154 moves the pointer 61*b* according to the pressed control button to display the 3D animation of the frame number indicated by the pointer 61*b* in the display area 60*e*. The display control unit 154 displays the video information of the frame number indicated by the pointer 61*b* in the display area 60*f*. Note that the display control unit 154 may convert the frame number into time (reproduction time) to execute each process.

Furthermore, the display control unit 154 compares the frame number indicated by the pointer 61*b* with the table 200A to identify the element of the element identification information including the frame number indicated by the pointer 61*b* from the start frame number to the end frame number. The display control unit 154 moves the cursor 61*c* to the position in the display area 60*a* corresponding to the identified element identification information.

Meanwhile, in a case where the user scans the input unit 120 and selects any difficulty level included in the display area 60*a*, the display control unit 154 may display the 3D animation corresponding to the frame number of the element of the selected difficulty level in the display area 60*e*. Furthermore, the display control unit 154 may display the video information corresponding to the frame number of the element of the selected difficulty level in the display area 60*f*.

For example, in a case where any difficulty level (or symbol) included in the display area 60*a* is selected, the display control unit 154 compares the selected difficulty level with the table 200A to identify the start frame number and the end frame number of the element of the selected difficulty level. The display control unit 154 obtains, from the 3D model information 143, information regarding the 3D animation corresponding to the frame number from the identified start frame number to end frame number, and causes it to be displayed in the display area 60*e*. The display control unit 154 obtains, from the video information 142, information regarding the video information corresponding to the frame number from the identified start frame number to end frame number, and causes it to be displayed in the display area 60*f*.

Here, the user is enabled to refer to another screen by operating the input unit 120 to press a screen switching button 62. For example, when the display control unit 154 receives the pressing of the screen switching button 62 of the scoring screen 60, it generates information regarding a superimposed screen 65 in which the 3D animation and a reference plane are superimposed, and outputs it to the display unit 130 for display.

Figure 10:
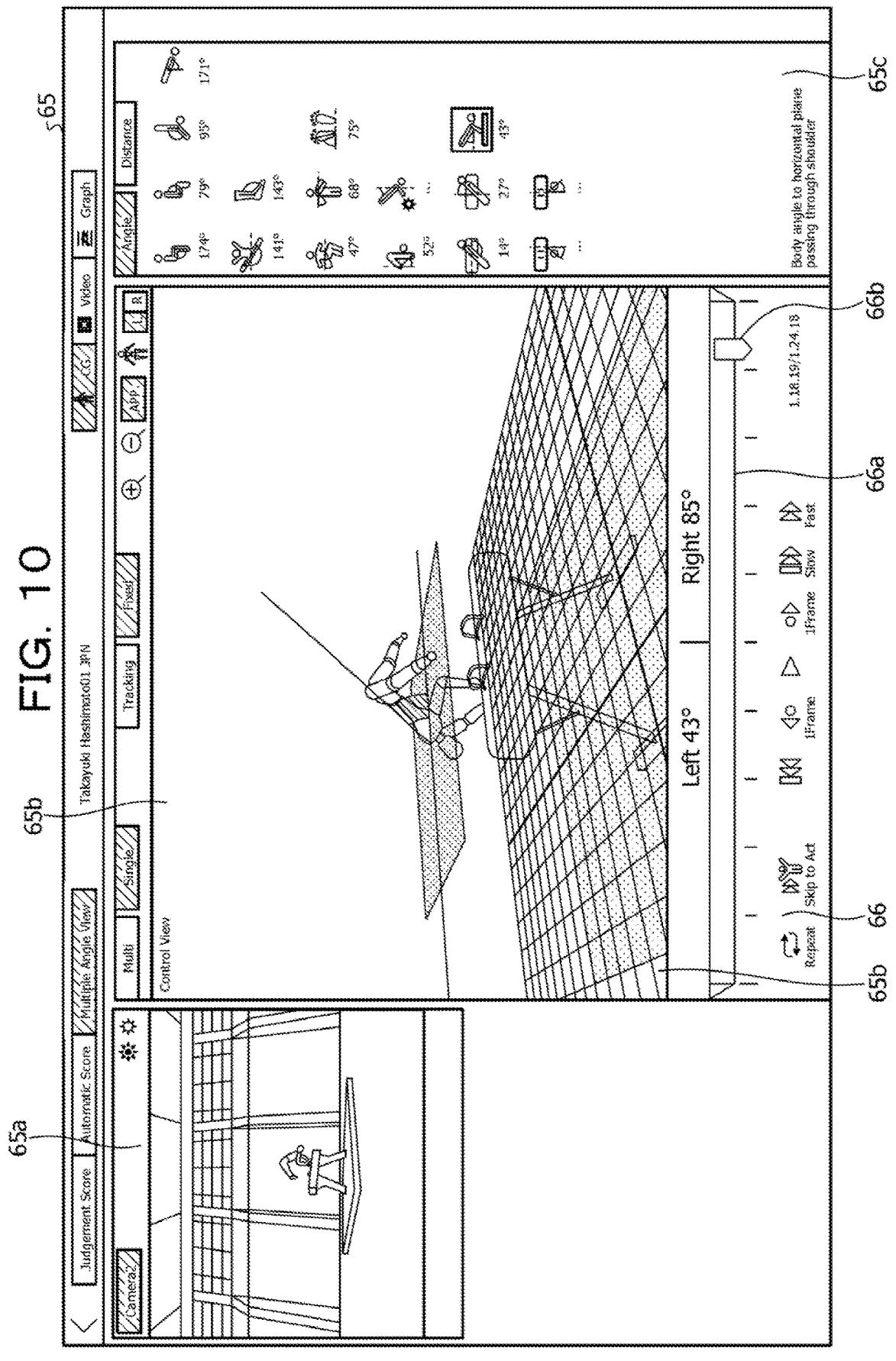
FIG. 10 is a diagram (1) illustrating an exemplary superimposed screen.

FIG. 10 is a diagram (1) illustrating an example of the superimposed screen. For example, the superimposed screen 65 includes display areas 65*a* to 65*c* and a control panel area 66. The display area 65*a* is an area for displaying video information. The display area 65*b* is an area for displaying superimposed video in which a reference plane and a 3D animation are superimposed. The display area 65*c* is an area for displaying each icon that specifies setting conditions of the reference plane. When the user operates the input unit 120 to select any of icons present in the display area 65*c*, the display control unit 154 superimposes the reference plane corresponding to the selected setting conditions for the reference plane on the 3D animation, thereby generating a superimposed image. For example, the setting conditions for the reference plane include a size of the 3D model of the reference plane, an angle at which the reference plane is arranged, a skeleton position of the 3D model that aligns the reference plane, and the like.

The control panel area 66 includes, for the video information displayed in the display area 65*a* and the superimposed video displayed in the display area 65*b*, respective control buttons for playing, frame-advancing, fast-forwarding, fast-rewinding, and the like, a slide bar 66*a*, and a pointer 66*b*. The horizontal axis of the slide bar 66*a* corresponds to the time from the start of the performance of the gymnast 10 to the end of the performance.

The pointer 66*b* on the slide bar 66*a* indicates reproduction time (frame number) of the superimposed video displayed in the display area 65*b* and the video information displayed in the display area 65*a*. The user is enabled to specify the position of the pointer 66*b* by operating the input unit 120, and the display control unit 154 displays the superimposed video in the display area 65*b*, and displays the video information in the display area 65*a* with respect to the time corresponding to the specified position of the pointer 66*b*.

Note that, in the present embodiment, the reproduction time specified on the scoring screen 60 is also transferred to the switched superimposed screen. For example, the judge may want to check in detail whether or not a specific element has been successful on the scoring screen 60. In this case, the judge specifies the specific element on the scoring screen 60, and when the screen is switched, reproduction is performed from the execution period of the specific element on the superimposed screen. The judge is enabled to check the specific element in detail by checking the superimposed screen.

Figure 11:
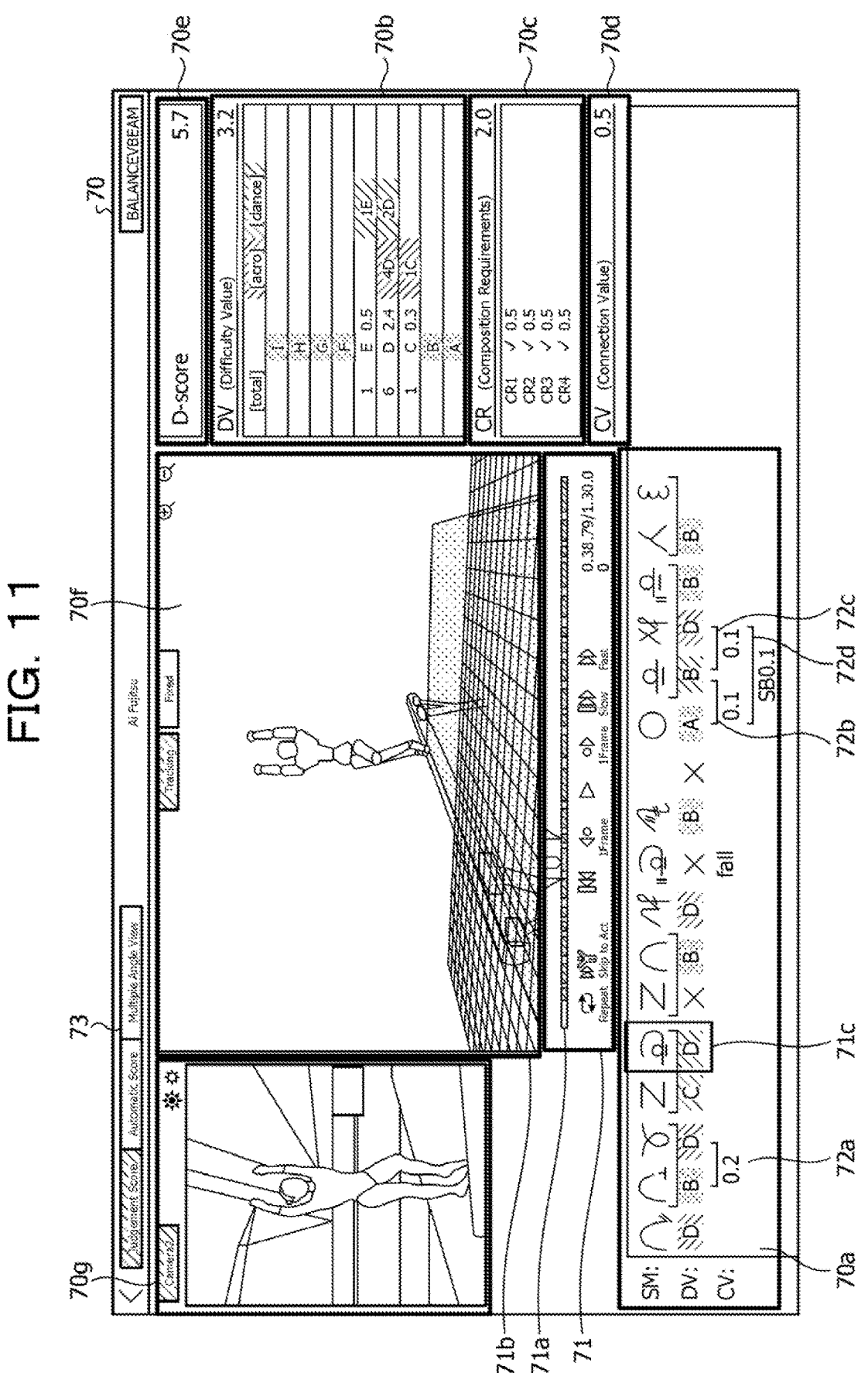
FIG. 11 is a diagram (2) illustrating an exemplary scoring screen.

Next, another example of the scoring screen generated by the display control unit 154 will be described. FIG. 11 is a diagram (2) illustrating an example of the scoring screen. As illustrated in FIG. 11, a scoring screen 70 includes display areas 70*a* to 70*g* and a control panel area 71. The display control unit 154 generates the scoring screen 70 using the preprocessing result described with reference to FIG. 9. The preprocessing result described with reference to FIG. 9 is, for example, information generated on the basis of the scoring rule corresponding to the performance event "balance beam", the gender "female", and the class classification "senior".

The display control unit 154 generates information regarding the display area 70*a* on the basis of the table 201A of the preprocessing result 201. The display area 70*a* corresponds to the "first display area". The display control unit 154 displays, in chronological order, respective types of elements included in the performance and difficulty levels of the elements with respect to the display area 60*a*. The display control unit 154 displays an element type using a symbol.

The display control unit 154 controls display of a difficulty level to be displayed in the display area 70*a* in chronological order on the basis of the table 201A. The display control unit 154 displays a difficulty level of the element at which the unsuccess flag is turned "on" using a "cross mark". The display control unit 154 displays the difficulty level at which the scoring target flag is turned "on" with emphasis over the difficulty level at which the scoring target flag is not turned "on". For example, the display control unit 154 displays the difficulty level at which the scoring target flag is not turned "on" in gray. The display control unit 154 displays "fall" in the display area 70*a* for the element in which the presence/absence of a fall is "presence". The display control unit 154 displays a difficulty level of an acrobatics-type element and a difficulty level of a dance-type element respectively in different colors.

Furthermore, the display control unit 154 indicates, in the display area 70*a*, a portion corresponding to a combination of elements for giving a CV (SB) score on the basis of the information regarding the CV included in the score calculation result information 201B. For example, at a position 72*a*, it is indicated that a CV "0.2 points" is given by a combination of elements of the difficulty level B and difficulty level D. At a position 72*b*, it is indicated that a CV "0.1 points" is given by a combination of the difficulty level A and the difficulty level B. At a position 72*c*, it is indicated that a CV "0.1 points" is given by a combination of the difficulty level B and the difficulty level D. At a position 72*d*, it is indicated that an SB "0.2 points" is given by a combination of the difficulty level A, the difficulty level B, and the difficulty level D.

The display control unit 154 generates information regarding the display areas 70*b*, 70*c*, 70*d*, and 70*e* on the basis of the score calculation result information 201B of the preprocessing result 201. The display control unit 154 sets, in the display area 70*b*, information in which the difficulty level of the element to be used for DV scoring and the number of difficulty levels are associated with each other on the basis of the score calculation result information 201B. The display area 70*b* corresponds to the "second display area".

The display control unit 154 displays the number of acrobatics-type elements and the number of dance-type elements together in a case of displaying the difficulty levels of elements and the number of difficulty levels in the display area 70*b*. In the example illustrated in FIG. 11, it is indicated that, in the display area 70*b*, there is one element of the difficulty level E to be used for scoring, and that the element is a dance-type element. In the display area 70*b*, it is indicated that there are six elements of the difficulty level D to be used for scoring, and that four of them are acrobatics-type elements and two of them are dance-type elements. In the display area 70*b*, it is indicated that there is one element of the difficulty level C to be used for scoring, and that the element is an acrobatics-type element.

The display control unit 154 displays, in the display area 70*c*, the CR1 to CR4 and information regarding whether or not the element corresponding to each CR has been performed on the basis of the score calculation result information 201B. Furthermore, the display control unit 154 sets the CR score in the display area 70*c*.

The display control unit 154 sets information regarding the CV score in the display area 70*d* on the basis of the score calculation result information 201B. Note that, the information to be the basis for the CV score is present in the display area 70*a*.

The display control unit 154 sets information regarding the D-score in the display area 70*e* on the basis of the score calculation result information 201B. The D-score is a score that is the sum of the DV score, the CR score, and the CV score. The display area 70*e* corresponds to the "third display area".

The display control unit 154 obtains the 3D model information 143 from the storage unit 140, and causes the 3D animation based on the 3D model information 143 to be displayed in the display area 70*f*. The display area 70*f* corresponds to the "fourth display area".

The display control unit 154 obtains the video information 142 from the storage unit 140, and causes the video information to be displayed in the display area 70*g*.

The display control unit 154 generates respective control buttons for playing, frame-advancing, fast-forwarding, fast-rewinding, and the like, a slide bar 71*a*, and a pointer 71*b*, and sets them in the control panel area 71. For the slide bar 71*a*, the display control unit 154 indicates the period during which the element to be used for scoring is performed with a "first color", and indicates the period during which the element to be used for scoring is not performed with a "second color" on the basis of the table 201A. For example, the first color is set to white, and the second color is set to gray.

The user operates the input unit 120 to press the respective control buttons, and the display control unit 154 moves the pointer 71*b* according to the pressed control button to display the 3D animation of the frame number indicated by the pointer 71*b* in the display area 70*f*. The display control unit 154 displays the video information of the frame number indicated by the pointer 71*b* in the display area 70*f*. Note that the display control unit 154 may convert the frame number into time (reproduction time) to execute each process.

Furthermore, the display control unit 154 compares the frame number indicated by the pointer 71*b* with the table 201A to identify the element of the element identification information including the frame number indicated by the pointer 71*b* from the start frame number to the end frame number. The display control unit 154 moves a cursor 71*c* to the position in the display area 70*a* corresponding to the identified element identification information.

Here, the user is enabled to refer to another screen by operating the input unit 120 to press a screen switching button 73. For example, when the display control unit 154 receives the pressing of the screen switching button 73 of the scoring screen 70, it generates information regarding a superimposed screen 75 in which the 3D animation and the reference plane are superimposed, and outputs it to the display unit 130 for display.

Figure 12:
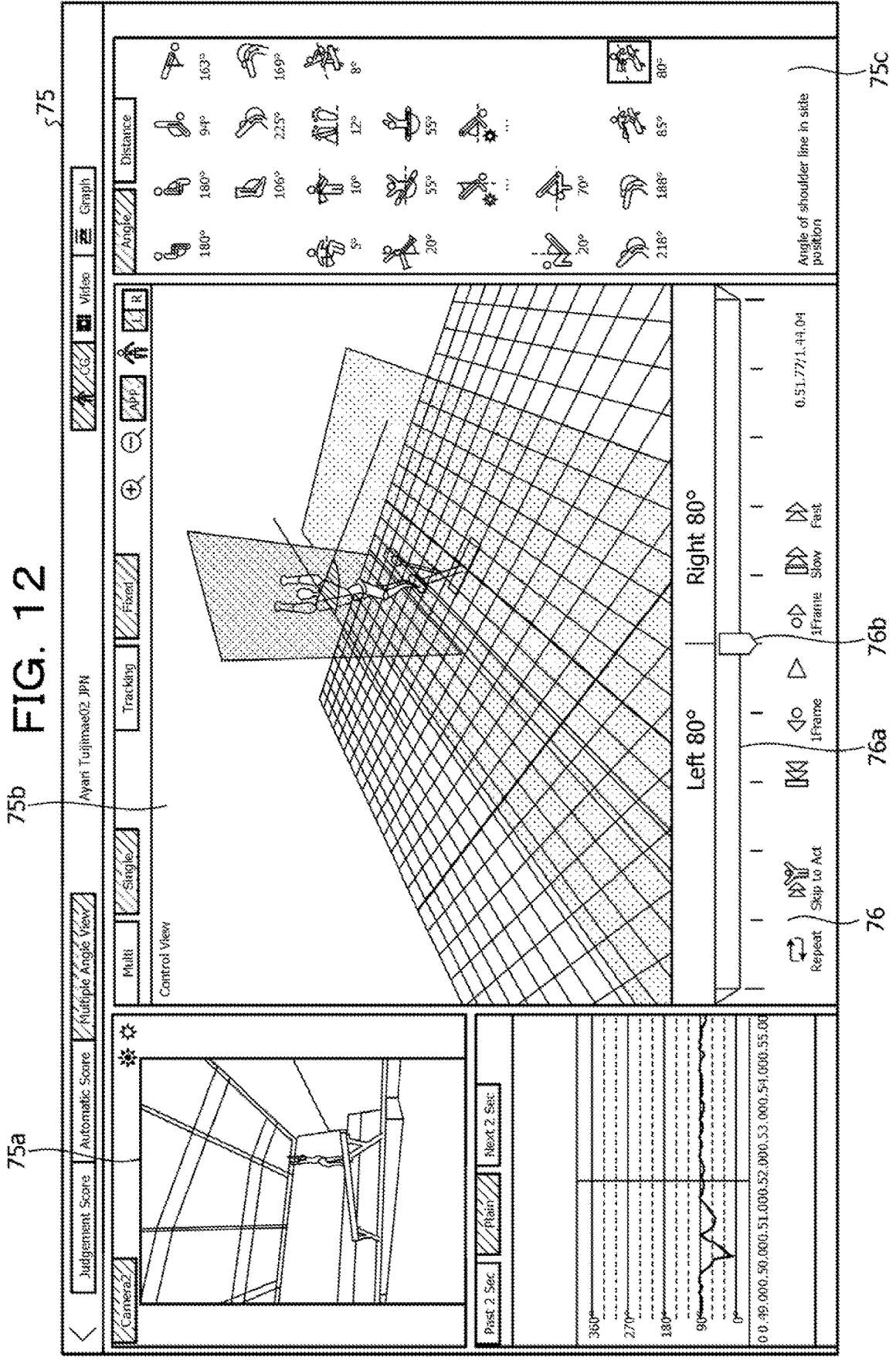
FIG. 12 is a diagram (2) illustrating an exemplary superimposed screen.

FIG. 12 is a diagram (2) illustrating an example of the superimposed screen. For example, the superimposed screen 75 includes display areas 75*a* to 75*c* and a control panel area 76. The display area 75*a* is an area for displaying video information. The display area 75*b* is an area for displaying superimposed video in which a reference plane and a 3D animation are superimposed. The display area 75c is an area for displaying each icon that specifies setting conditions of the reference plane. When the user operates the input unit 120 to select any of icons present in the display area 75c, the display control unit 154 superimposes the reference plane corresponding to the selected setting conditions for the reference plane on the 3D animation, thereby generating a superimposed image. For example, the setting conditions for the reference plane include a size of the 3D model of the reference plane, an angle at which the reference plane is arranged, a skeleton position of the 3D model that aligns the reference plane, and the like.

The control panel area 76 includes, for the video information displayed in the display area 75a and the superimposed video displayed in the display area 75b, respective control buttons for playing, frame-advancing, fast-forwarding, fast-rewinding, and the like, a slide bar 76a, and a pointer 76b. The horizontal axis of the slide bar 76a corresponds to the time from the start of the performance of the gymnast 10 to the end of the performance.

The pointer 76b on the slide bar 76a indicates reproduction time (frame number) of the superimposed video displayed in the display area 75b and the video information displayed in the display area 75a. The user is enabled to specify the position of the pointer 76b by operating the input unit 120, and the display control unit 154 displays the superimposed video in the display area 75b, and displays the video information in the display area 75a with respect to the time corresponding to the specified position of the pointer 76b.

Next, an exemplary processing procedure of the information processing apparatus according to the present embodiment will be described. FIG. 13 is a flowchart illustrating a processing procedure of the information processing apparatus according to the present embodiment. As illustrated in FIG. 13, the acquisition unit 151 of the information processing apparatus 100 obtains the input information 141, and stores it in the storage unit 140 (step S101).

The acquisition unit 151 obtains the element recognition result information 144, and stores it in the storage unit 140 (step S102). The acquisition unit 151 obtains the 3D model information 143 and the video information 142, and stores them in the storage unit 140 (step S103).

The determination unit 152 of the information processing apparatus 100 determines a scoring rule on the basis of the input information 141 and the rule table 147 (step S104). The preprocessing unit 153 of the information processing apparatus 100 determines a difficulty level of each element included in a series of performances on the basis of the determined scoring rule, the difficulty level definition table 145, and the element recognition result information 144 (step S105). Along with that, the preprocessing unit 153 refers to the group definition table 146 to determine an element group.

The preprocessing unit 153 identifies the element to be used for scoring on the basis of the determined scoring rule and the difficulty level of each element (step S106). The preprocessing unit 153 calculates a D-score and a relevant score on the basis of the determined scoring rule (step S107). If the gender is "male" in step s107, the relevant score includes a DV and EG. If the gender is "female", the relevant score includes a DV, CR, and CV.

The display control unit 154 of the information processing apparatus 100 generates a base image of the scoring screen corresponding to the event of the performance, gender, and class classification, and arranges information of each display area (step S108). Each display area includes a first display area, a second display area, a third display area, and a fourth display area.

In the first display area, the display control unit 154 arranges, in chronological order, a symbol of each element included in the series of performances and a difficulty level in association with each other (step 5109). The display control unit 154 changes the difficulty level corresponding to an unsuccessful element to a cross mark in the first display area (step 5110).

The display control unit 154 displays the difficulty level of an element not to be used for scoring in gray in the first display area (step S111). The display control unit 154 causes the display unit 130 to display the scoring information, and reproduces the video information and the 3D animation (step S112).

Next, an exemplary processing procedure of calculating a D-score on the basis of a certain scoring rule corresponding to the input information 141 will be described. FIG. 14 is a flowchart (1) of a process of calculating a D-score on the basis of a scoring rule. The scoring rule of FIG. 14 is set as a scoring rule corresponding to the event "pommel horse", the gender "male", and the class classification "senior". In FIG. 14, an "element" indicates an element identified by "element identification information".

The preprocessing unit 153 of the information processing apparatus 100 scans from the start element to the last element included in the element recognition result information 144 (step S201). The preprocessing unit 153 excludes an element "Sivado" on the basis of presence/absence of a Russian element after the element "Sivado" (step S202).

The preprocessing unit 153 executes processing of downgrading the difficulty level of the element "Sohn" or the element "Bezugo" (step S203). For example, in step S203, if the element "Sohn" or the element "Bezugo" is present at the beginning of the performance or it has fallen immediately before, the preprocessing unit 153 downgrades the difficulty level by two levels.

The preprocessing unit 153 identifies a continuous element (flop/combine) (step S204). For example, if the preprocessing unit 153 detects a predetermined combination of elements set in advance in step S204, it acknowledges the predetermined combination of elements as a combined element.

The preprocessing unit 153 excludes dismounts other than the element performed at the end (step S205). The preprocessing unit 153 excludes a repetitive element (step S206). The preprocessing unit 153 acknowledges each of forward and backward 3/3 travel elements up to once (step S207).

The preprocessing unit 153 acknowledges a Russian wendeswing element up to twice (step S208). The preprocessing unit 153 acknowledges up to two elements passing through a handstand position (step S209). The preprocessing unit 153 selects up to ten elements including the dismount for a plurality of elements (acknowledged elements) included in a series of performances, and calculates a DV (step S210). In step S210, the preprocessing unit 153 turns on the scoring target flag of the selected element.

The preprocessing unit 153 determines presence/absence of elements of the groups (1) to (4), and calculates each group point (EG) (step S211). The preprocessing unit 153 adds the DV and EG to calculate a D-score (step S212).

Figure 15:
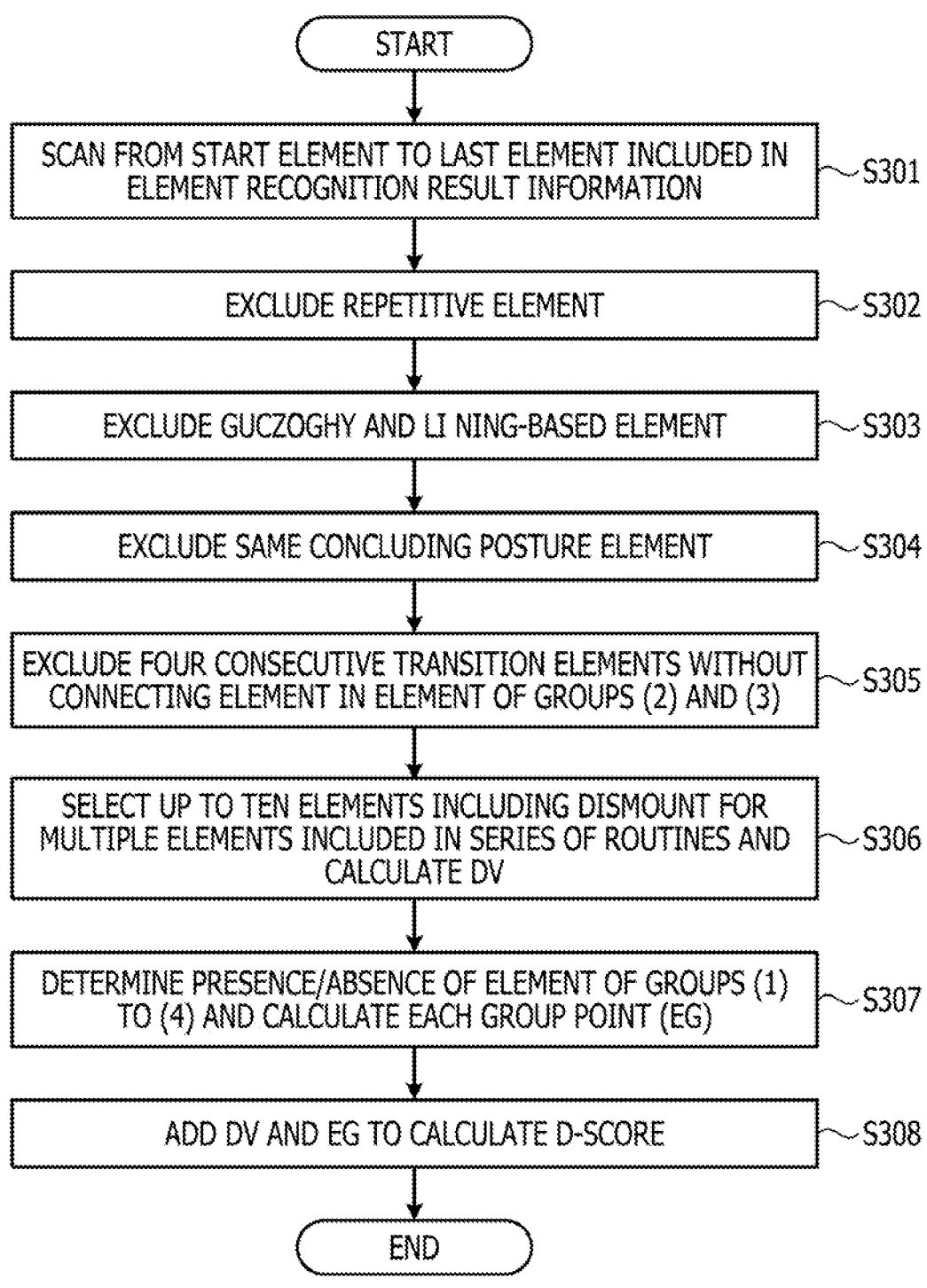
FIG. 15 is a flowchart (2) of the process of calculating the D-score on the basis of the scoring rule.

FIG. 15 is a flowchart (2) of the process of calculating the D-score on the basis of the scoring rule. The scoring rule of FIG. 15 is set as a scoring rule corresponding to the event "rings", the gender "male", and the class classification "senior". In FIG. 15, an "element" indicates an element identified by "element identification information".

The preprocessing unit 153 of the information processing apparatus 100 scans from the start element to the last element included in the element recognition result information 144 (step S301). The preprocessing unit 153 excludes a repetitive element (turns on the unsuccess flag) (step S302). The preprocessing unit 153 excludes Guczoghy and Li Ning-based elements (step S303).

The preprocessing unit 153 excludes the same concluding posture element (step S304). In the elements of the groups (2) and (3), the preprocessing unit 153 excludes four consecutive transition elements without a connecting element (step S305). The preprocessing unit 153 selects up to ten elements including the dismount for a plurality of elements (acknowledged elements) included in a series of performances, and calculates a DV (step S306). In step S306, the preprocessing unit 153 turns on the scoring target flag of the selected element.

The preprocessing unit 153 determines presence/absence of elements of the groups (1) to (4), and calculates each group point (EG) (step S307). The preprocessing unit 153 adds the DV and EG to calculate a D-score (step S308).

Next, effects of the information processing apparatus 100 according to the present embodiment will be described. The information processing apparatus 100 determines a scoring rule corresponding to the input information among a plurality of types of scoring rules, determines a difficulty level of elements and narrows down the elements to be used for scoring on the basis of the determined scoring rule, and generates and displays a scoring screen. As a result, it becomes possible to display information to be the basis for calculating a performance score according to the scoring rule corresponding to the conditions of the input information.

For example, the scoring screen includes a first display area, a second display area, a third display area, and a fourth display area. By referring to the first display area, the user is enabled to check the elements included in the performance and the difficulty level of each of them. By referring to the second display area, the user is enabled to check the difficulty level of the element to be used for scoring and the aggregate results of the number of performed elements for each difficulty level. By checking the third display area, the user is enabled to check the performance score (D-score) based on the difficulty level of the element to be used for scoring. By checking the fourth display area, the user is enabled to check the posture of the gymnast 10 by referring to the 3D animation.

In a case where a predetermined combination of elements is included, the information processing apparatus 100 adds the score corresponding to the combination to the performance score on the basis of the scoring rule, whereby it becomes possible to calculate a score unique to the scoring rule. In a case where the same element is included more than once, the information processing apparatus 100 sets one element of the same elements as an element used for scoring and excludes other same elements from the scoring target on the basis of the scoring rule, whereby it becomes possible to exclude the repetitive element from the scoring target.

In the first display area, the information processing apparatus 100 displays the difficulty level of the element to be used for scoring in a manner of being emphasized more than the display of the difficulty level of elements other than the element to be used for scoring. As a result, it becomes possible to easily confirm which element is used for scoring and which element is not used.

The information processing apparatus 100 selects a scoring rule in which the class classification is senior or a scoring rule in which the class classification is junior, and adjusts the number of elements to be used for scoring, whereby it becomes possible to calculate a D-score according to the class classification appropriately.

In a case where the scoring rule corresponding to the input information including female as gender is selected, the information processing apparatus 100 classifies each element into an acrobatics-type element or a dance-type element on the basis of the selected scoring rule, and displays the number of acrobatics-type elements and the number of dance-type elements. As a result, the user is enabled to check the number of acrobatics-type elements and the number of dance-type elements.

In a case of displaying a plurality of elements and respective difficulty levels of them in the first display area, the information processing apparatus 100 displays a color of the difficulty levels of the acrobatics-type elements and a color of the difficulty levels of the dance-type elements in a distinguished manner. As a result, the user is enabled to easily distinguish between the difficulty levels of the acrobatics-type elements and the difficulty levels of the dance-type elements in addition to the order of the difficulty levels of respective elements included in the performance.

In a case where selection of any element of the plurality of elements displayed in the first display area is received, the information processing apparatus 100 causes the 3D animation corresponding to the time of the selected element to be displayed in the fourth display area. As a result, it becomes possible to check each element displayed in the first display area by 3D animation.

In a case of displaying the 3D animation in the fourth display area, the information processing apparatus 100 may switch between securing (fixing) the space of the fourth display area or moving (tracking) the space around the position of the gymnast 10 depending on the event of the performance. As a result, it becomes possible to allow the user to view the 3D animation so that the element according to the event may be easily evaluated.

Since the information processing apparatus 100 displays the information regarding the superimposed screen in which the 3D animation and the reference plane are superimposed, it becomes possible to display the relationship between each joint of the 3D model and the angle to the reference plane and the like in an easy-to-understand manner.

Meanwhile, the processing of the information processing apparatus 100 described above is an example, and other processing may be executed. For example, the data structure of the element recognition result information obtained by the information processing apparatus 100 from the element determination device 50 is not limited to FIG. 2, and "likelihood" indicating certainty of the element identification information may be further associated for each element identification information. While the element determination device 50 may calculate the likelihood in any way, and for example, it may specify the probability of the element output from a neural network (NN) as a likelihood in a case of determining the element using the NN. Furthermore, the element determination device 50 makes adjustment to reduce the likelihood in a case where a state of sensor information is bad (the number of point groups is small) or the like. The element determination device 50 may specify the likelihood using another technique.

Figure 16:
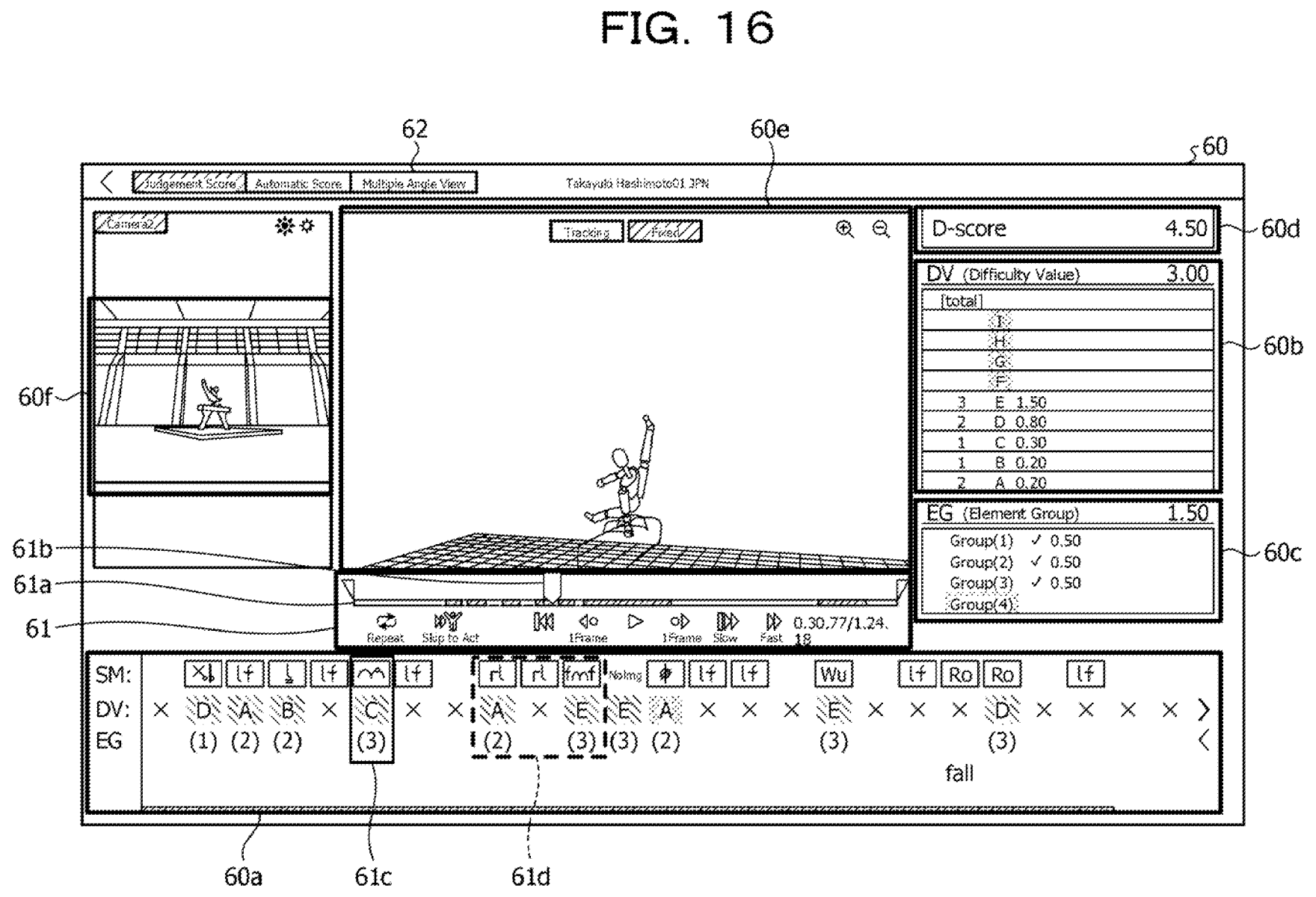

In a case of generating information regarding the scoring screen, the display control unit 154 of the information processing apparatus 100 may display, in the first display area, the element and the difficulty level of the element identified under the conditions that the likelihood is less than a threshold value in a manner of being distinguishable. FIG. 16 is a diagram (3) illustrating an example of the scoring screen. In FIG. 16, a cursor 61d is added in the display area 60a in the scoring screen 60 described with reference to FIG. 3. The display control unit 154 emphasizes and displays, using the cursor 61d, a series of elements included in the display area 60a for which the element and the difficulty level are determined under the conditions that the likelihood is less than the threshold value. By referring to the scoring screen 60, the user is enabled to easily grasp the element with the difficulty level specified on the basis of the information with low likelihood among the series of elements displayed by the information processing apparatus 100.

Furthermore, in a case where a certain difficulty level is selected by the user in the first display area, the display control unit 154 may emphasize and display the difficulty level same as the selected difficulty level among the series of difficulty levels displayed in the first display area.

Figure 17:
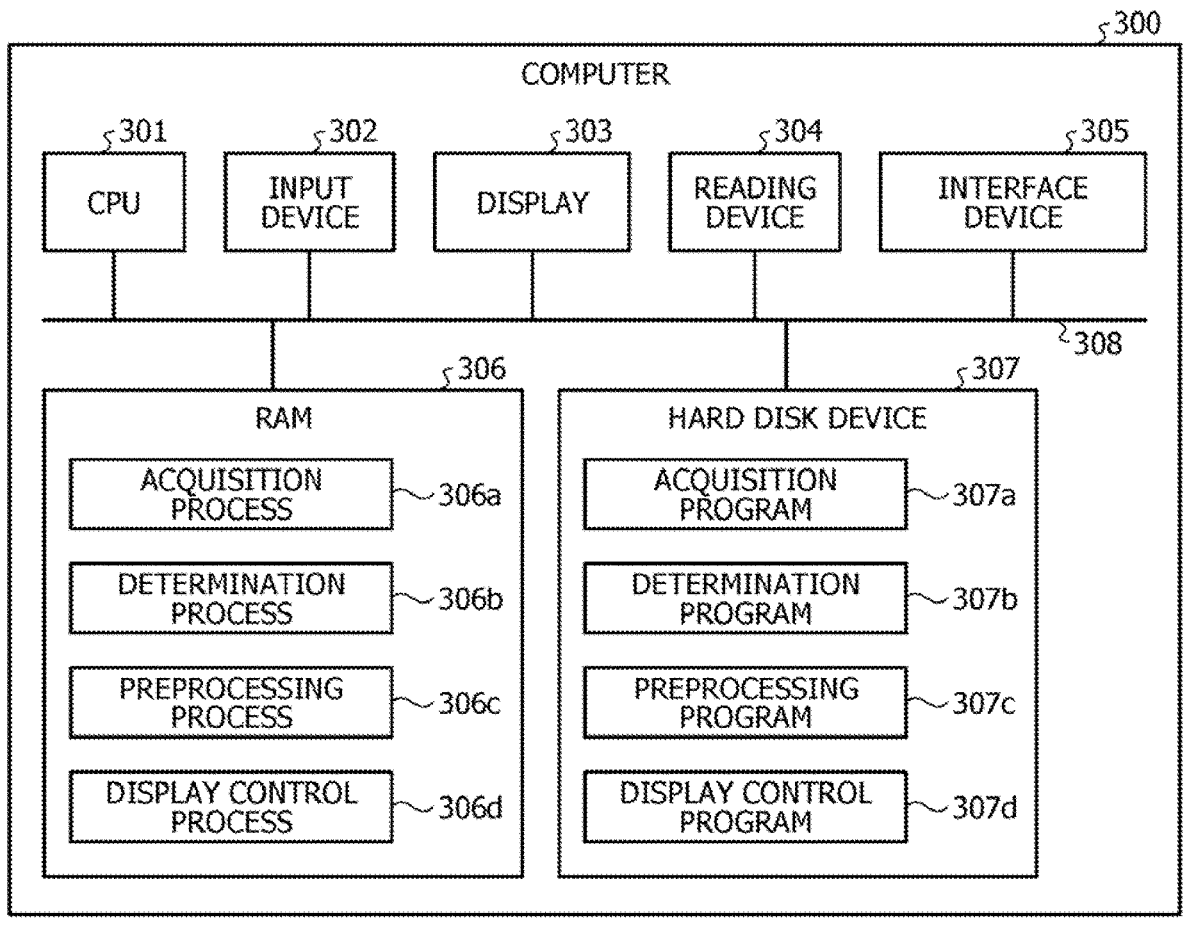
FIG. 17 is a diagram illustrating an exemplary hardware structure of a computer that implements functions similar to those of the information processing apparatus.

Next, an exemplary hardware structure of a computer that implements functions similar to those of the information processing apparatus 100 described above will be described. FIG. 17 is a diagram illustrating an exemplary hardware configuration of a computer that implements functions similar to those of the information processing apparatus.

As illustrated in FIG. 17, a computer 300 includes a CPU 301 that executes various types of arithmetic processing, an input device 302 that receives input of data from the user, a display 303, and a reading device 304. Furthermore, the computer 300 includes the element determination device 50, the camera 30, and an interface device 305 that receives information from other external devices. The computer 300 includes a RAM 306 that temporarily stores various types of information, and a hard disk device 307. Then, each of the devices 301 to 307 is connected to a bus 308.

The hard disk device 307 includes an acquisition program 307a, a determination program 307b, a preprocessing program 307c, and a display control program 307d. The CPU 301 reads the acquisition program 307a, the determination program 307b, the preprocessing program 307c, and the display control program 307d to load them in the RAM 306.

The acquisition program 307a functions as an acquisition process 306a. The determination program 307b functions as a determination process 306b. The preprocessing program 307c functions as a preprocessing process 306c. The display control program 307d functions as a display control process 306d.

Processing of the acquisition process 306a corresponds to the processing of the acquisition unit 151. Processing of the determination process 306b corresponds to the processing of the determination unit 152. Processing of the preprocessing process 306c corresponds to the processing of the preprocessing unit 153. Processing of the display control process 306d corresponds to the processing of the display control unit 154.

Note that the respective programs 307a to 307d may not need to be stored in the hard disk device 307 beforehand. For example, each of the programs is stored in a "portable physical medium" such as a flexible disk (FD), a compact disc read only memory (CD-ROM), a digital versatile disc (DVD) disk, a magneto-optical disk, or an IC card to be inserted in the computer 300. Then, the computer 300 may read and execute each of the programs 307a to 307d.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A display method for outputting a result of scoring for a performance of a scoring competition, the display method comprising:
    obtaining sensing data comprising time-series three-dimensional coordinates of a plurality of joints of an athlete;
    generating skeletal motion data from the time-series three-dimensional coordinates;
    obtaining input information including an event, gender, and class classification of the scoring competition;
    determining a first rule among the plurality of types of scoring rules based on the input information;
    identifying a plurality of elements included in the performance by comparing the generated skeletal motion data with a plurality of pre-defined element motion patterns;
    applying the first rule to the identified plurality of elements to determine a final difficulty level for each of the plurality of elements by determining an upgrade or a downgrade of difficulty level;
    selecting a part of the plurality of elements to be used for the scoring in descending order of the final difficulty level;
    calculating a score of the performance based on the selected part of the elements;
    generating an interactive scoring screen that includes a first display area, a second display area, a third display area, and a fourth display area, the first display area displaying the identified plurality of elements and the final difficulty level of each of the elements in chronological order and highlighting the selected part of the plurality of elements in different style from other elements, the second display area being an area for an aggregate result of a number of elements of each difficulty level for the selected part of the elements, the third display area being an area for a score of the performance directed to the selected part of the elements, the fourth display area being area for a 3D model of the athlete generated on the basis of the sensing data; and
    in response to a user selection of an element in the first display area or a position on a timeline of the performance, cause the fourth display area to play back the 3D model corresponding to the user selected element or position on the timeline.

2. The display method according to claim 1, further comprising:
    calculating the score of the performance based on the final difficulty level of the target element to be used for the scoring.

3. The display method according to claim 2, wherein
    the calculating includes calculating, when a combination of predetermined elements is included based on the recognition result and the first rule, the score of the performance by adding a score corresponding to the combination.

4. The display method according to claim 3, comprising:

performing, when a plurality of identical elements is included based on the recognition result and the first rule, a process, wherein the process includes:

setting one element among the plurality of identical elements as the target to be used for the scoring, and excluding other identical elements from the target to be used for the scoring.

5. The display method according to claim 1, wherein in the first display area, the final difficulty level of the target element to be used for the scoring in a manner of being emphasized more than display of a difficulty level of an element other than the target element to be used for the scoring.

6. The display method according to claim 1, wherein the selecting includes limiting, when the first rule is determined based on the input information including a senior as the class classification, top N elements at a highest difficulty level among the plurality of elements, and the selecting includes limiting, when the first rule is determined based on the input information including a junior as the class classification, top M (M is smaller than N) elements at the highest difficulty level among the plurality of elements.

7. The display method according to claim 1, wherein the determining includes classifying, when the first rule is determined based on the input information including a female as the gender, the element of the determined difficulty level into an acrobatics-type element and a dance-type element, and the outputting includes outputting a number of the acrobatics-type elements and a number of the dance-type elements among the number of elements of each difficulty level for the selected part of the elements for the second display area.

8. The display method according to claim 7, wherein the first screen area displays, in a case of displaying the plurality of elements and the difficulty level of each of the elements for the first display area, the plurality of elements and the difficulty level by distinguishing a color of a difficulty level of the acrobatics-type element and a color of a difficulty level of the dance-type element.

9. The display method according to claim 1, wherein an element that is included in the plurality of elements included in the recognition result is associated with time information, and outputting, when selection of any of the plurality of elements displayed in the first display area is received, the 3D model of the athlete corresponding to time of the selected element in the fourth display area.

10. The display method according to claim 1, the fourth display area fixed in a case where the event of the scoring competition included in the input information is any event of rings, pommel horse, horizontal bar, and uneven parallel bars, and displays the space to be displayed in the fourth display area in synchronization with a position of the 3D model when the event of the scoring competition included in the input information is any event of vault, balance beam, parallel bars, and floor.

11. The display method according to claim 1, further comprising:

displaying, when selection of a difficulty level is received, an element corresponding to the difficulty level for which the selection is received in the first display area.

12. The display method according to claim 1, wherein when an instruction for display switching is received, screen information of the interactive scoring screen includes the 3D model and a reference plane superimposed.

13. The display method according to claim 1, further comprising:

storing, when an instruction to confirm a scoring result is received from a user, the sensing data and information displayed in each of the first display area, the second display area, and the third display area.

14. A non-transitory computer-readable storage medium storing a display program that causes a processor included in an information processing apparatus that outputs a result of scoring for a performance of a scoring competition to execute a process, the process comprising:

obtaining sensing data comprising time-series three-dimensional coordinates of a plurality of joints of an athlete;

generating skeletal motion data from the time-series three-dimensional coordinates;

obtaining input information including an event, gender, and class classification of the scoring competition;

determining a first rule among the plurality of types of scoring rules based on the input information;

identifying a plurality of elements included in the performance by comparing the generated skeletal motion data with a plurality of pre-defined element motion patterns;

applying the first rule to the identified plurality of elements to determine a final difficulty level for each of the plurality of elements by determining an upgrade or a downgrade of difficulty level;

selecting a part of the plurality of elements to be used for the scoring in descending order of the final difficulty level;

calculating a score of the performance based on the selected part of the elements;

generating an interactive scoring screen that includes a first display area, a second display area, a third display area, and a fourth display area, the first display area displaying the identified plurality of elements and the final difficulty level of each of the elements in chronological order and highlighting the selected part of the plurality of elements in different style from other elements, the second display area being an area for an aggregate result of a number of elements of each difficulty level for the limited part of the elements, the third display area being an area for a score of the performance directed to the limited part of the elements, the fourth display area being area for a 3D model of the athlete generated on the basis of the sensing data; and in response to a user selection of an element in the first display area or a position on a timeline of the performance, cause the fourth display area to play back the 3D model corresponding to the user selected element or position on the timeline.

15. An information processing apparatus that outputs a result of scoring for a performance of a scoring competition, the information processing apparatus comprising:

a memory; and a processor coupled to the memory and configured to:

obtain sensing data comprising time-series three-dimensional coordinates of a plurality of joints of an athlete;

generate skeletal motion data from the time-series three-dimensional coordinates;

obtain input information including an event, gender, and class classification of the scoring competition;

determine a first rule among the plurality of types of scoring rules based on the input information;

identify a plurality of elements included in the performance by comparing the generated skeletal motion data with a plurality of pre-defined element motion patterns;

apply the first rule to the identified plurality of elements to determine a final difficulty level for each of the plurality of elements by determining an upgrade or a downgrade of difficulty level;

select a part of the plurality of elements to be used for the scoring in descending order of the final difficulty level;

calculate a score of the performance based on the selected part of the elements;

generate an interactive scoring screen that includes a first display area, a second display area, a third display area, and a fourth display area, the first display area displaying the identified plurality of elements and the final difficulty level of each of the elements in chronological order and highlighting the selected part of the plurality of elements in different style from other elements, the second display area being an area for an aggregate result of a number of elements of each difficulty level for the limited part of the elements, the third display area being an area for a score of the performance directed to the limited part of the elements, the fourth display area being area for a 3D model of the athlete generated on the basis of the sensing data; and in response to a user selection of an element in the first display area or a position on a timeline of the performance, cause the fourth display area to play back the 3D model corresponding to the user selected element or position on the timeline.

\* \* \* \* \*